(12) United States Patent
Sheffer et al.

(10) Patent No.: US 10,282,858 B2
(45) Date of Patent: May 7, 2019

(54) METHODS AND SYSTEMS FOR ESTIMATING THREE-DIMENSIONAL INFORMATION FROM TWO-DIMENSIONAL CONCEPT DRAWINGS

(71) Applicants: The University of British Columbia, Vancouver (CA); The Governing Council of The University of Toronto, Toronto (CA); Institut National De Recherche En Informatique Et En Automatique

(72) Inventors: Alla Sheffer, Vancouver (CA); Karan Singh, Toronto (CA); Adrien Bousseau, Courlay (FR); Will Chang, Vancouver (CA); Baoxuan Xu, Vancouver (CA); James McCrae, Brampton (CA)

(73) Assignees: The University of British Columbia, Vancouver (CA); The Governing Council of the University of Toronto, Toronto (CA); Institut National de Recherche en Informatique et en Automatique, Le Chesnay (FR)

( * ) Notice: Subject to any disclaimer, the term of this patent is extended or adjusted under 35 U.S.C. 154(b) by 69 days.

(21) Appl. No.: 15/302,764

(22) PCT Filed: Apr. 16, 2015

(86) PCT No.: PCT/CA2015/050319
§ 371 (c)(1),
(2) Date: Oct. 7, 2016

(87) PCT Pub. No.: WO2015/157868
PCT Pub. Date: Oct. 22, 2015

(65) Prior Publication Data
US 2017/0039722 A1     Feb. 9, 2017

Related U.S. Application Data

(60) Provisional application No. 61/981,573, filed on Apr. 18, 2014.

(51) Int. Cl.
*G06T 17/30*     (2006.01)
*G06T 7/543*     (2017.01)
*G06T 5/00*      (2006.01)

(52) U.S. Cl.
CPC .............. *G06T 7/543* (2017.01); *G06T 17/30* (2013.01); *G06T 5/002* (2013.01); *G06T 2207/20092* (2013.01)

(58) Field of Classification Search
CPC ........... G06T 7/543; G06T 7/50; G06T 7/507; G06T 7/55; G06T 7/564; G06T 7/60;
(Continued)

(56) References Cited

U.S. PATENT DOCUMENTS

| 7,239,314 B2 | 7/2007 | Johnston |
| 2006/0177125 A1* | 8/2006 | Chan ........................ G06K 9/00 382/154 |

(Continued)

OTHER PUBLICATIONS

Toeppe et al. "Relative volume constraints for single view 3D reconstruction.", IEEE Conference on Computer Vision and Pattern Recognition (CVPR), Jun. 23-28, 2013, pp. 177 to 184.
(Continued)

*Primary Examiner* — Dwayne D Bost
*Assistant Examiner* — Stephen M Brinich
(74) *Attorney, Agent, or Firm* — Chernoff, Vilhauer, McClung & Stenzel, LLP

(57) ABSTRACT

A method is for estimating a three-dimensional (3D) representation of a set of two-dimensional (2D) curves of a concept drawing, the estimate of the 3D representation corresponding to a 3D object underlying the concept draw-
(Continued)

ing. The method comprises: obtaining a representation of a set of 2D curves a concept drawing that represent a 3D object underlying the concept drawing; determining an energy function based on the set of 2D curves, the energy function comprising one or more terms, each term reflective of a preference for a 3D representation based on a characteristic of the 2D curves which reflects how concept drawings are commonly perceived to represent 3D objects; and performing an optimization which minimizes the energy function to thereby determine the 3D representation.

24 Claims, 9 Drawing Sheets

(58) Field of Classification Search
CPC ........... G06T 7/73; G06T 17/30; G06T 17/20; G06T 17/205; G06T 17/10; G06T 17/05; G06T 17/00
USPC .......... 382/276, 282, 285, 154; 345/418–426
See application file for complete search history.

(56) References Cited

U.S. PATENT DOCUMENTS

| | | | |
|---|---|---|---|
| 2006/0274063 | A1 | 12/2006 | Grandine et al. |
| 2008/0018643 | A1* | 1/2008 | Feilkas ................ G06T 7/50 345/420 |
| 2008/0246762 | A1 | 10/2008 | Ogata et al. |
| 2010/0220099 | A1 | 9/2010 | Maekawa et al. |
| 2010/0315412 | A1* | 12/2010 | Sinha ................ G06T 7/0065 345/419 |
| 2014/0229143 | A1 | 8/2014 | Cohen-Or et al. |

OTHER PUBLICATIONS

Shao, Cloud, et al. "CrossShade: shading concept sketches using cross-section curves.", ACM Transactions on Graphics, Jul. 2012, vol. 31, issue 4, Article No. 45.
Zhuang, Yixin, et al., "A general and efficient method for finding cycles in 3D curve networks", ACM Transactions on Graphics, Nov. 2013, vol. 32, issue 6, Article No. 180.
Wang, Yingze, et al., "3D reconstruction of curved objects from single 2D line drawings." IEEE Conference on Computer Vision and Pattern Recognition (CVPR), Jun. 20-25, 2009.
Andre, A., and Saito, S. 2011. Single-view sketch based modeling. In Proc. Sketch-Based Interfaces and Modeling.
Bae, S., Balakrishnan, R., and Singh, K. 2008. ILoveSketch: as-natural-as-possible sketching system for creating 3d curve models. In Proc. User Interface Software and Technology.
Bessmeltsev, M., Wang, C., Sheffer, A., and Singh, K. 2012. Design-driven quadrangulation of closed 3d curves. ACM Trans. Graph. 31,5.
Bommes, D., Zimmer, H., and Kobbelt, L. 2009. Mixed-integer quadrangulation. ACM Transactions on Graphics (Proc. SIGGRAPH) 28, 3, 77:1-77:10.
Stevens, K. A. 1981. The visual interpretation of surface contours. Artificial Intelligence 17.
Chen, T., Zhu, Z., Shamir, A., Hu, S.-M., and Cohen-Or, D. 2013. 3-sweep: Extracting editable objects from a single photo. ACM Trans. Graphics 32, 6.
Gingold, Y., Igarashi, T., and Zorin, D. 2009. Structured annotations for 2D-to-3D modeling. ACM Trans. Graph. 28, 5.
Igarashi, T., Matsuoka, S., and Tanaka, H. 1999. Teddy: a sketching interface for 3D freeform design. Proc. SIGGRAPH.
Kara, L. B., and Shimada, K. 2007. Sketch-based 3d-shape creation for industrial styling design. IEEE Comput. Graph. Appl. 27, 1, 60-71.

Knill, D. C. 1992. Perception of surface contours and surface shape: from computation to psychophysics. Journal of Optical Society of America 9, 9, 1449-1464.
Do Carmo, M. P. 1976. Differential Geometry of Curves and Surfaces. Prentice-Hall, Englewood Cliffs, NJ.
Lau, M., Saul, G., Mitani, J., and Igarashi, T. 2010. Modeling-in-context: user design of complementary objects with a single photo. In Proc. Sketch-Based Interfaces and Modeling, 17-24.
Lee, S., Feng, D., and Gooch, B. 2008. Automatic construction of 3d models from architectural line drawings. In Proc. Interactive 3D graphics & games, 123-130.
Li, Y., Wu, X., Chrysanthou, Y., Shari, A., Cohen-Or, D., and Mitra, N. J. 2011. GlobFit: Consistently fitting primitives by discovering global relations. ACM Trans. Graph. 30, 4.
Lipson, H., and Shpitalni, M. 1996. Optimization-based reconstruction of a 3d object from a single freehand line drawing. Computer-Aided Design 28, 651-663.
Lowe, D. G. 1987. Three-dimensional object recognition from single two-dimensional images. Artif. Intell. 31, 3, 355-395.
Malik, J. 1987. Interpreting line drawings of curved objects. International Journal of Computer Vision 1, 1, 73-103.
Mamassian, P., and Landy, M. S. 1998. Observer biases in the 3D interpretation of line drawings. Vision research 38, 18, 2817-2832.
McCrae, J., Singh, K., and Mitra, N. 2011. Slices:a shape-proxy based on planar sections. ACM Trans. Graph. 30, 6.
Nakayama, K., and Shimojo, S. 1992. Experiencing and Perceiving Visual Surfaces. Science 257, 1357-1363.
Nealen, A., Igarashi, T., Sorkine, O., and Alexa, M. 2007. Fibermesh: designing freeform surfaces with 3d curves. ACM Trans. Graph. 26.
Olsen, L., Samavati, F., Sousa, M., and Jorge, J. 2009. Sketch-based modeling: A survey. Computers & Graphics 33.
Olsen, L., Samavati, F., and Jorge, J. A. 2011. Naturasketch: Modeling from images and natural sketches. IEEE Computer Graphics and Applications 31, 6, 24-34.
Orbay, G., and Kara, L. B. 2012. Sketch-based surface design using malleable curve networks. Computers & Graphics 36, 8, 916-929.
Perkins, D. 1971. Cubic corners, oblique views of pictures, the perception of line drawings of simple space forms. geometry and the perception of pictures: Three studies. Tech. rep., Harvard Univ., Cambridge, MA. Graduate School of Education.
Pizlo, Z., and Stevenson, A. 1999. Shape constancy from novel views. Perception & Psychophysics 61, 7, 1299-1307.
Schmidt, R., Khan, A., Kurtenbach, G., and Singh, K. 2009. On expert performance in 3D curve-drawing tasks. In Proc. Sketch-Based Interfaces and Modeling.
Schmidt, R., Khan, A., Singh, K., and Kurtenbach, G. 2009. Analytic drawing of 3d scaffolds. ACM Trans. Graph. 28, 5.
Sharf, A., Alcantara, D. A., Lewiner, T., Greif, C., Sheffer, A., Amenta, N., and Cohen-Or, D. 2008. Space-time surface reconstruction using incompressible flow. ACM Trans. Graph. 27, 5, 110:1-110:10.
Shtof, A., Agathos, A., Gingold, Y., Shamir, A., and Cohen-Or, D. 2013. Geosemantic snapping for sketch-based modeling. Computer Graphics Forum 32, 2, 245-253.
Sykora, D., Kavan, L., t Mak, M., Jamri§ka, 0., Jacobson, A., Whited, B., Simmons, M., and Sorkine-Hornung, 0. 2014. Ink-and-ray: Bas-relief meshes for adding global illumination effects to hand-drawn characters. ACM Trans. Graphics 33.
Tian, C., Masry, M., and Lipson, H. 2009. Physical sketching: Reconstruction and analysis of 3D objects from freehand sketches. Computer Aided Design 41, 3, 147-158.
Andre, A., Saito, S., and Nakajima, M. 2007. Crosssketch: freeform surface modeling with details. In Proc. Symp. on Sketch-Based Interfaces and Modeling, 45-52.
Gangnet, M., Herve, J.-C., Pudet, T., and Van Thong, J.-M. 1989. Incremental computation of planar maps. SIGGRAPH 23 (July), 345-354.
Liu, Y., Pottmann, H., Wallner, J., Yang, Y.-L., and Wang, W. 2006. Geometric modeling with conical meshes and developable surfaces. ACM Trans. Graphics 25, 3,681-689. Proc. SIGGRAPH.
Masry, M., Kang, D., and Lipson, H. 2005. A freehand in sketching interface for progressive construction of 3d objects. Computers & Graphics 29,4,563-575.

(56) References Cited

OTHER PUBLICATIONS

Mehra, R., Zhou, Q., Long, J., Sheffer, A., Gooch, A., and Mitra, N. J. 2009. Abstraction of man-made shapes. ACM Transactions on Graphics 28, 5, #137, 1-10.

Sutherland, I. 1964. Sketch pad a man-machine graphical communication system. In Proceedings of the SHARE design automation workshop, ACM, 6-329.

Eissen, K., and Steur, R. 2011. Sketching: The Basics. Bis Publishers.

Eissen, K., and Steur, R. 2008. Sketching: Drawing Tech-piques for Product Designers. Bis Publishers.

Biard et al., "Construction of rational surface patches bounded by lines of curvature", 2010, Comput. Aided Geom. Des. 27, 359-371.

Cole et al., "How well do line drawings depict shape?", 2009, ACM Trans. on Graph. (Proc. of SIGGRAPH) 28, 3.

Ecker et al., "Shape from planar curves: A linear escape from flatland", 2007, In IEEE Computer Vision and Pattern Recognition.

Farin et al., "Discrete coons patches", 1999, Computer Aided Geometric Design 16 (August), 691-700.

Finch et al., "Freeform vector graphics with controlled thin-plate splines", 2011, ACM Trans. on Graph. (Proc. SIGGRAPH Asia) 30.

Gooch et al., "A non-photorealistic lighting model for automatic technical illustration", 1998, SIGGRAPH, 447-452.

Johnston, S. F., "Lumo: illumination for cel animation", 2002, In Proc. Symp. on Non-Photorealistic Animation and Rendering.

Joshi, P. et al., "Repoussé: Automatic inflation of 2d artwork", 2008, In Proc. of Sketch Based Interfaces and Modeling.

Koenderink et al., "Surface perception in pictures", 1992, Perception & Psychophysics, 487-496.

Nasri et al., "Filling N-Sided Regions by Quad Meshes for Subdivision Surfaces", 2009, Computer Graphics Forum 28, 6 (Sept.), 1644-1658.

Okabe et al., "Single-view relighting with normal map painting", 2006, In Proc. Pacific Graphics, 27-34.

Orzan et al., "Diffusion curves: A vector representation for smooth-shaded images", 2008, ACM Trans. on Graph. (Proc. SIGGRAPH) 27.

Sýkora et al., "Lazy-Brush: Flexible painting tool for hand-drawn cartoons", 2009, Computer Graphics Forum (Proc. EUROGRAPHICS) 28, 2.

Winnemöller et al., "Texture design and draping in 2d images", 2009, Computer Graphics Forum (Proc. Symp. on Rendering) 28, 4.

Wu et al., "Shapepalettes: interactive normal transfer via sketching", 2007, ACM Trans. on Graph. (Proc. of SIGGRAPH) 26.

Zhang et al., "Single view modeling of free-form scenes", 2002, In IEEE Computer Vision and Pattern Recognition, 990-997.

Ulupinar, F.; Nevatia, R., "Shape from contour: straight homogeneous generalized cylinders and constant cross section generalized cylinders," Pattern Analysis and Machine Intelligence, IEEE Transactions on, vol. 17, No. 2, pp. 120,135, Feb. 1995.

Kazmi, I.K.; Lihua You; Jian Jun Zhang, "A Survey of Sketch Based Modeling Systems," Computer Graphics, Imaging and Visualization (CGIV), 2014 11th International Conference on, vol., No., pp. 27,36, Aug. 6-8, 2014.

Wong, K.K.Y., Paulo RS Mendonça, and Roberto Cipolla. "Reconstruction of surfaces of revolution from single uncalibrated views." Proceedings of the British Machine Vision Conference. vol. 1. 2002.

* cited by examiner

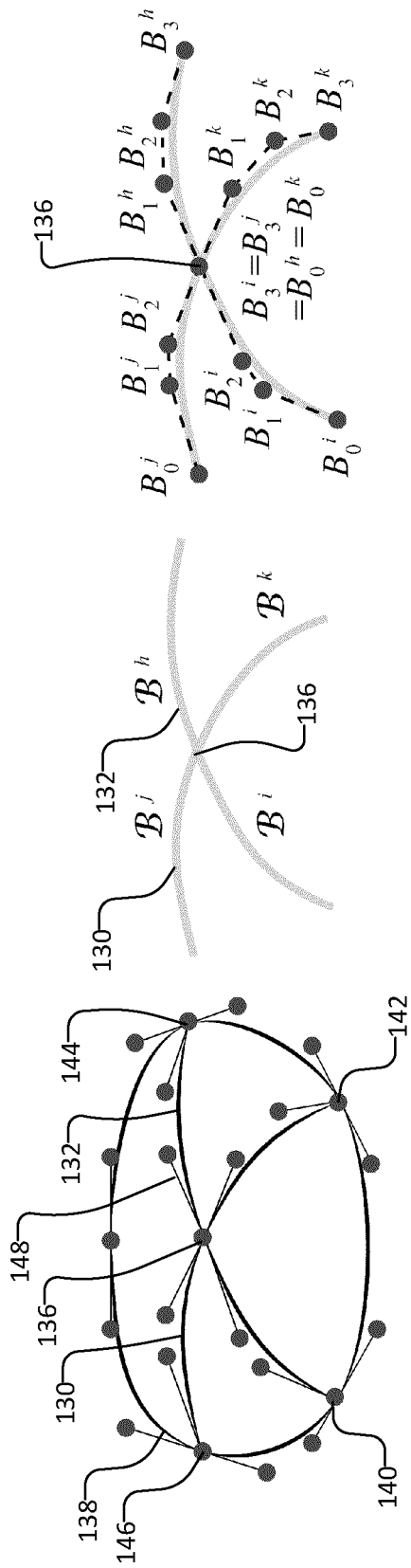
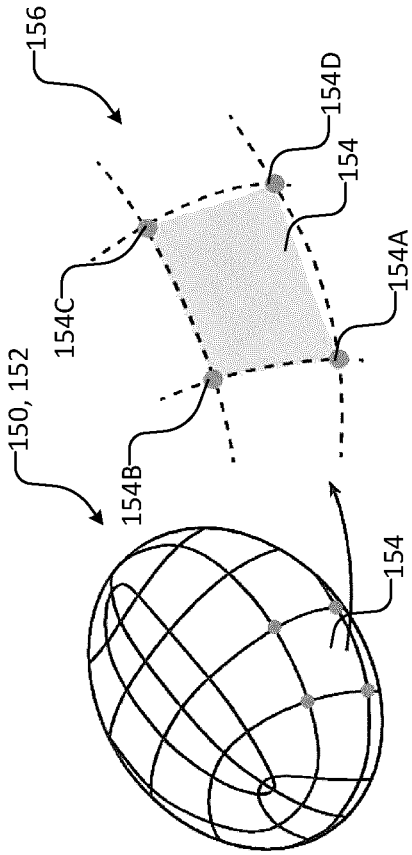
FIGURE 4A
FIGURE 4B
FIGURE 4C
FIGURE 5A
FIGURE 5B

METHODS AND SYSTEMS FOR ESTIMATING THREE-DIMENSIONAL INFORMATION FROM TWO-DIMENSIONAL CONCEPT DRAWINGS

RELATED APPLICATIONS

This application claims the benefit of the priority of U.S. application No. 61/981,573 filed on 18 Apr. 2014 which is hereby incorporated herein by reference.

TECHNICAL FIELD

This application relates to computer-based representations of objects. Particular embodiments provide methods and systems for estimating three-dimensional information relating to such objects based on two-dimensional concept drawings of such objects.

BACKGROUND

Concept drawings (also referred to as concept sketches) are two-dimensional representations of objects which are used by artists and designers to convey aspects of the objects' three-dimensional shapes.

An examples of a concept drawing 10 is shown in FIG. 1. Concept drawing 10 is a drawing of a sports bag. The actual sports bag may be referred to herein as the object underlying concept drawing 10. Concept drawings 10 typically include a number of types of lines or curves. Boundary curves 11 demarcate parts of the object underlying concept drawings 10. Boundary curves 11 may include smooth silhouette curves (or, for brevity, silhouettes) 12 and sharp boundary curves (also referred to as, sharp boundaries, boundaries or trim curves) 14. Silhouettes 12 may demarcate transitions between visible and hidden parts of a smooth surface and may be dependent on the views depicted in concept drawings 10. In mathematical terms, silhouettes 12 may demarcate parts of concept drawings 10 where the surface normal of the objects underlying the concept drawings 10 transitions from facing toward the viewer to facing away from the viewer. Trim curves 14 can demarcate ends of surfaces, junctions between different parts of objects, sharp bends on surfaces, discontinuous transitions and/or the like. In some views and/or for some objects boundary curves 11 can be both silhouettes 12 and trim curves 14 or such silhouettes 12 and trim curves 14 may overlap.

In addition to boundary curves 11, artists and designers typically use cross-section curves (or, for brevity, cross-sections) 16 which aid in the drawing of concept drawings 10 and in the viewer's interpretation of the three-dimensional appearance of objects underlying concept drawings 10. The intersections of cross-sections 16 may be referred to as cross-hairs 18 or cross-section intersections 18. When drawn in concept drawings 10, cross-sections 16 are only two-dimensional. However, cross-sections 16 are used to convey three-dimensional information by depicting intersections of imagined three-dimensional surfaces with three-dimensional planes. Cross-sections 16 and cross-hairs 18 carry important perceptual information for viewers and are typically drawn at or near locations where they maximize (or at least improve) the clarity of concept drawings 10.

While not expressly shown in the particular case of the illustrative concept drawings 10 shown in FIG. 1, concept drawings 10 may also incorporate hidden curves, which may be used to show features that are not visible from the viewer's perspective or are otherwise obscured from the viewer. Such hidden curves may also be characterized as silhouettes, trim curves or cross-sections. In some circumstances curves used in concept drawings need not be any of the aforementioned types of curves.

Concept drawings 10 may be drawn using a computer or otherwise input into a computer. Computers may make use of a variety of suitable representations of concept drawings 10 and there underlying curves. By way of non-limiting example, the Cartesian (x,y) coordinates of a curve in a concept drawing 10 may be represented parametrically in a computer according to:

$$Q(u)=(x(u),y(u)) \tag{1}$$

where u is known as the parameter of the representation. It is typical, but not necessary, that the parameter u be in the range [0,1]—i.e. $0<=u<=1$. Non-limiting examples of parametric curve representations include polynomial representations of the form:

$$x(u)=\Sigma_{k=0}^{n} a_k u^k$$

$$y(u)=\Sigma_{k=0}^{n} b_k u^k \tag{2}$$

where n is the order of the polynomial representation and the polynomials are defined by the coefficients $a_k$, $b_k$. It is common, but not necessary, that the degree n of a polynomial representation is selected to be n=3 (referred to as a cubic representation). Non-limiting examples of particular types of polynomial curve representations include Hermite curve representations, Bezier curve representations and/or the like. Such curve representations may be characterized by corresponding control points which determine the shape of the curve.

More complex curves may be represented by piecewise polynomial representations, wherein the complex curves are divided into segments and each segment is represented by a corresponding polynomial representation. It is common in computer graphics to refer to such a complex curve as a path or a spline and to the individual segments as curves. The representation corresponding to each segment of a spline may be characterized by a set of observable control points. Such control points can be manipulated to control corresponding manipulation of the segment. In the case of Bezier representations, the control points at the ends of each segment are on the end of the segment and each segment shares a control point with each of its neighboring segments. Smoothness of the spline may be provided by ensuring that the control point at which two adjacent segments meet is on a line between the two adjacent control points.

Other forms of curve representations used in computer graphics and which could be used to represent the curves of a concept drawing include, without limitation, B-spline representations, other non-uniform rational basis spline (NURBS) representations and/or the like.

Another form of curve representation used in computer graphics and which could be used to represent the curves of a concept drawing is known as a polyline representation (also referred to as a polygonal chain representation), where the curve is divided into sequence of points (referred to as vertices) and the curve comprises a plurality of line segments that connect consecutive vertices.

There exists a number of techniques for estimating three-dimensional information based on two-dimensional concept drawings of objects. For instance, such techniques may depend on the order in which curves are drawn, and/or may not be suitable for recovering 3D shape information from existing 2D sketches. Other techniques attempt to shade 2D drawings to better convey 3D characteristics, but may be insufficient to generate a consistent 3D model from a 2D input drawing. Still other techniques depend on multiple views, by which users may incrementally define 3D models by adding to existing surfaces. Some techniques may be directed towards converting substantially rectilinear (e.g. "boxy") shapes and may have difficulties converting 2D sketches illustrating smooth free-form shapes into 3D representations. Some techniques may have difficulties in converting hand-drawn sketches generally, as such sketches may contain inaccuracies.

Given a two-dimensional concept drawing, there is a general desire to estimate a three-dimensional computer representation (and/or other three-dimensional information) corresponding to the object(s) underlying the concept drawing. Converting a 2D drawing into an accurate 3D model remains a significant challenge in the field of computer graphics. Computers are not naturally capable of extrapolating 3D information from 2D images, and so conversion techniques are required to generate 3D computer representations based on 2D images. Existing techniques struggle to provide accurate results, particularly when the input image is a 2D hand-drawn sketch, and/or impose other limitations on the conversion process. Accordingly, this is an area where there remains substantial potential for the functionality of computers to be improved and for the field of computer graphics to be advanced.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A-4C are schematic depictions of exemplary Bézier splines, segments and control points which may be used in the method of FIG. 3 according to particular embodiments.

FIG. 5A is a schematic depiction of an exemplary set of 2D curves corresponding to a concept drawing. FIG. 5B schematically depicts a number of 3D curves corresponding to the FIG. 5A 2D curves which demonstrate the conjugacy property of concept drawings.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide systems and methods for estimating three-dimensional information relating to object(s) based on two-dimensional concept drawing(s) of such object(s), wherein the three-dimensional information estimates the artist's intention as it relates to the three-dimensional object underlying the two-dimensional concept drawing(s). Given a two-dimensional representation of the curves of a concept drawing (e.g. a representation of the curves that maps to the Cartesian coordinates (x,y)) where the concept drawing is intended to convey an artist's interpretation of a three-dimensional object, aspects of the invention provide systems and methods for estimating a three-dimensional representation of such curves (e.g. a representation of the curves that maps to the Cartesian coordinates (x,y,z)) which is most (or at least acceptably) consistent with the artist's interpretation of the three-dimensional object underlying the two-dimensional concept drawing. In some embodiments, an estimate of a three-dimensional representation is considered accurate if it deviates from a substantially accurate representation of the underlying 3D object by less than a threshold amount. Evaluation of such acceptable deviation may be performed, for example, by conducting a comparison between volumetric shapes defined by the estimated and accurate representations and/or by approximating the deviation between the representations by eye.

Figure 1:
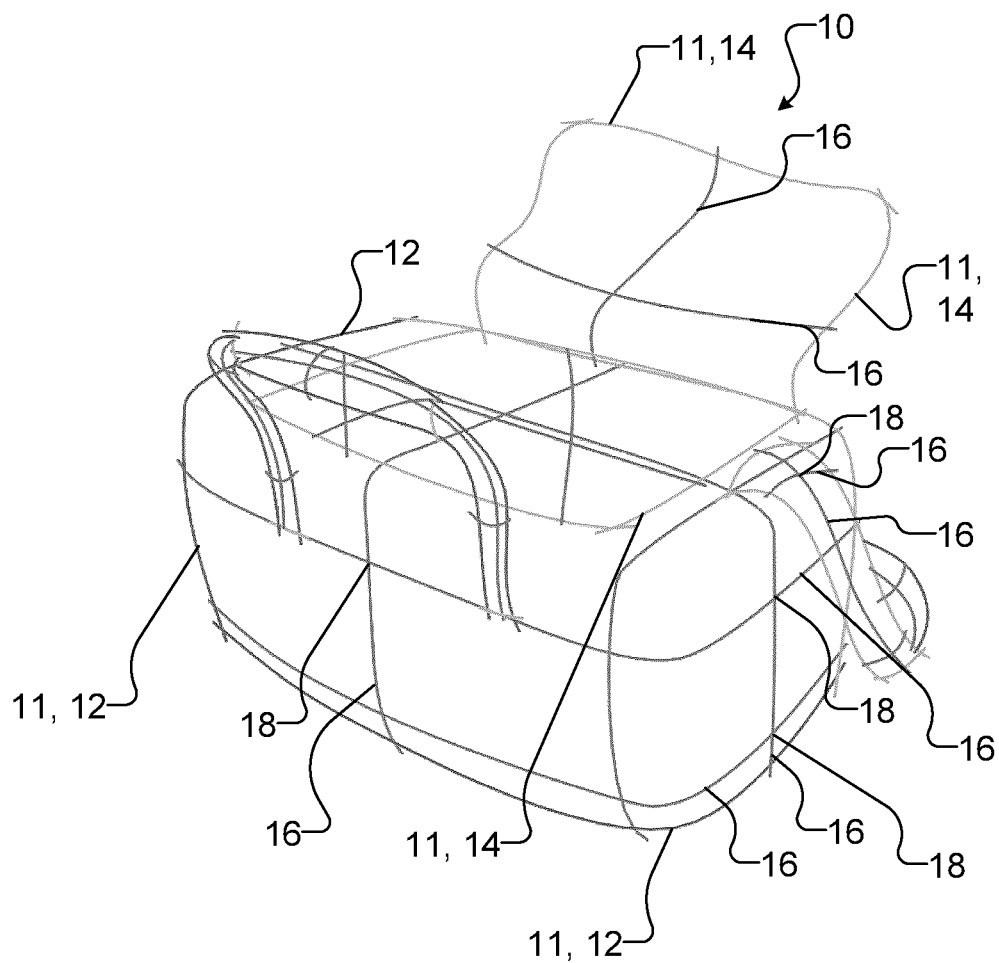
FIG. 1 is an example of a concept drawing which may be of the type that represents input to systems and methods according to particular embodiments of the invention.
Figure 2:
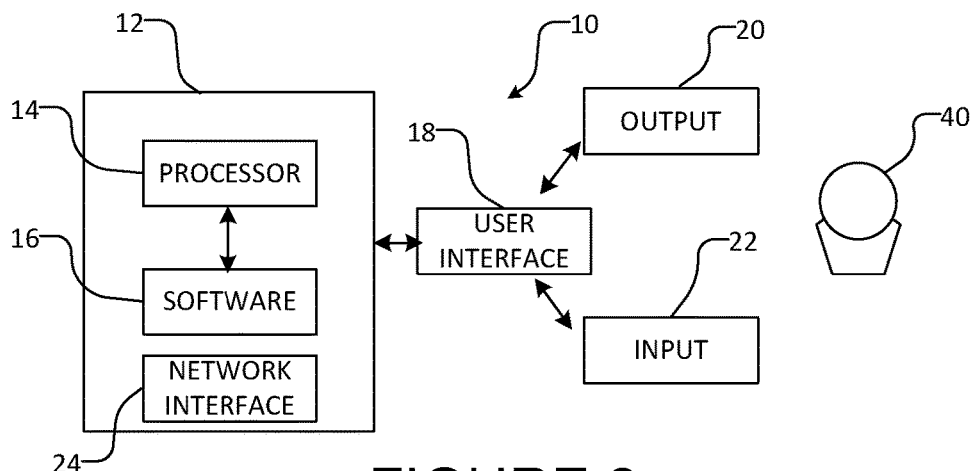
FIG. 2 is a block diagram representation of a system which may be configured to implement methods of the invention according to particular embodiments.

FIG. 2 is a block diagram representation of a system 10 which may be configured to implement methods of the invention according to particular embodiments. System 10 comprises a computer 12 which comprises one or more processors 14. Processor 14 executes software 16 which may be stored in processor 14 and/or in memory (not expressly shown) accessible to processor 14. Processor 14 may be configured (when executing software 16) to implement a user interface 18 which may comprise one or more output devices 20 and one or more input devices 22. Output device 20 may comprise a display, a printer and/or any other suitable output device which permits information to be output from computer 12 to a user 40. Input device 22 may comprise a mouse, a scanner, a keyboard, a touch-screen display and/or any other suitable input device which permits user 40 to provide information to computer 12. In some embodiments, computer 12 comprises a network interface 24 for communicating data via a suitable network. Methods according to particular embodiments may be performed by system 10. More particularly, methods according to particular embodiments may be performed by processor 14 when executing software 16. Such methods may improve the functionality of computer 12 and/or system 10 by enabling computer 12 and/or system 10 to convert input 2D concept drawings (received at input device 22 and/or otherwise) to 3D computer representations (output at output device 20 and/or otherwise) of objects underlying the concept drawings. When effecting such methods, processor 14 may control the functionality of any other aspects of system 10.

Figure 3:
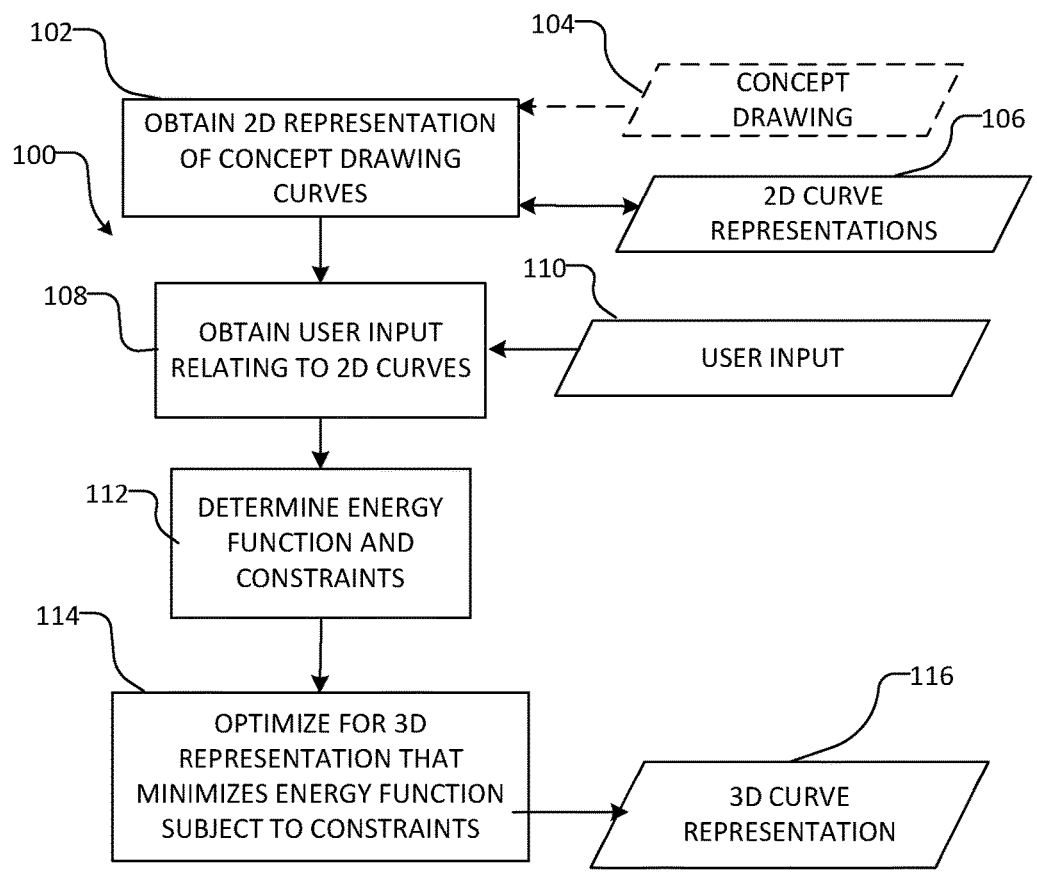
FIG. 3 is a block diagram representation of a method for estimating three-dimensional information relating to an object based on a two-dimensional concept drawing of the object according to a particular embodiment.

FIG. 3 is a block diagram representation of a method 100 for estimating three-dimensional information 116 relating to an object based on a two-dimensional concept drawing 104 of the object according to a particular embodiment. In some embodiments, method 100 may be performed by processor 14 of system 10. Method 100 begins in block 102 which comprises obtaining a two-dimensional representation 106 of the curves (for brevity, 2D curves 106) in a concept drawing 104. 2D curves 106 may be used in the remainder of method 100. In some embodiments, block 104 optionally comprises receiving concept drawing 104 (or initial 2D computer representations of the curves associated with concept drawing 104) and using concept drawing 104 as a basis for generating suitable 2D curves 106. For example, block 102 may involve receiving concept drawing 104 (or initial 2D computer representations of the curves associated with concept drawing 104) via input from user 40 (e.g. via input 22 (FIG. 2)). By way of non-limiting example, receiving concept drawing 104 may involve user 40 creating concept drawing 104 using suitable drawing software (e.g. Adobe Illustrator™, Autodesk SketchBook Designer™, Maya™ and/or the like), importing a concept drawing made on paper using input 22 (e.g. a scanner or the like) to obtain 104 and/or the like.

Block 102 may involve converting concept drawing 104 (or initial 2D computer representations of the curves associated with concept drawing 104) into 2D curves 106 which may be used in the remainder of method 100. In one particular embodiment, 2D curves 106 are represented in the form of 2D cubic Bézier splines, where each segment of the spline is represented by a cubic Bézier curve (Bézier segment) having four control points. Except where the context dictates otherwise, $i^{th}$ Bézier segment in 2D curves 106 may be designated herein by $\bar{\beta}^i$, with its control points designated as $\bar{B}_{0...3}^i$. In 2D curves 106, Bézier control points $\bar{B}_{0...3}^i$ may be specified by two-dimensional coordinates. In some embodiments, it is computational convenient to define the Bézier control points $\bar{B}_{0...3}^i$ using the (x,y) coordinates of a Cartesian coordinate system. Bézier splines are a convenient representation for 2D curves 106, but are not exclusive. In some embodiments, other suitable representations (e.g. B-splines, splines involving any other polynomial representations and/or the like) may be used to represent 2D curves 106. For the remainder of this description it will be assumed (without loss of generality) that 2D curves 106 are represented by 2D cubic Bézier splines.

Block 102 may involve converting concept drawing 104 (or initial 2D computer representations of the curves associated with concept drawing 104) into 2D cubic Bézier splines. For example, where concept drawing 104 is generated using drawing software, it may have the form of a 2D polyline representation or some other 2D representation. In such circumstances, the block 102 conversion of concept drawing 104 into 2D curves 106 may involve fitting Bézier splines to concept drawing 104, using suitable curve fitting technique(s) such as an iterative least squares curve fitting. In some embodiments, the Bézier spline representation of 2D curves 106 involves placing the end control points (e.g. $\bar{B}_0^i$ or $\bar{B}_3^i$) of Bézier segments at intersections between curves in concept drawings 104 (e.g. at intersections between boundary curves, at intersections, at intersections between cross-sections, at intersections between hidden lines (in the same layer), at intersections between any pair of these curves (in the same layer)) and at any other location where two curves intersect which is not specified (e.g. by user input) to be a non-intersection. Although it is computationally convenient to provide the Bézier end control points at the intersections of curves in concept drawings 104, this is not necessary, and other embodiments may employ different end control points.

Between intersections, block 102 may involve adding Bézier segments as desired to fit the curves of input concept drawing 104 to within an acceptable curve-fitting threshold. Such curve-fitting threshold between input concept drawing 104 and 2D curves 106 may be configurable (e.g. user configurable). In some embodiments, consecutive Bézier segments belonging to smooth curves in concept drawing 104 are constrained to have $G^1$ continuity that is, for a pair $G^1$ continuous Bézier segments $\bar{\beta}^i$, $\bar{\beta}^h$, the control points $\bar{B}_2^i$, $\bar{B}_3^i = \bar{B}_0^h$, $\bar{B}_1^h$ are constrained to be collinear. In some embodiment, such $G^1$ continuity is not necessary.

FIGS. 4A-4C are schematic depictions of exemplary Bézier splines, segments and control points and tangents which may have characteristics similar to that of 2D curves 106 obtained in block 102 according to particular embodiments. FIG. 4B shows four Bézier segments $\bar{\beta}^i$, $\bar{\beta}^h$, $\bar{\beta}^j$, $\bar{\beta}^k$, which are used to represent a pair of curves 130, 132 which may form part of concept drawing 104. Curves 130, 132 intersect at intersection 136. Accordingly, as discussed above, in some embodiments, curves 130, 132 are divided into Bézier segments having their end control points located at intersection 136. This is shown in FIG. 4C, where $\bar{B}_3^i = \bar{B}_3^j = \bar{B}_0^h = \bar{B}_0^k$ at intersection 136. FIG. 4A shows that curves 130, 132 also intersect with another curve 138 at intersections 140, 142, 144, 146. FIG. 4C shows that Bézier control points $\bar{B}_0^i$, $\bar{B}_3^k$, $\bar{B}_3^h$, $\bar{B}_0^j$ are also located at these intersections 140, 142, 144, 146. FIG. 4A also shows the above-discussed $G_1$ continuity property—e.g. for the continuous curve 132, control points $\bar{B}_2^i$, $\bar{B}_3^i = \bar{B}_0^h$, $\bar{B}_1^h$ (as labelled in FIG. 4C) are collinear on line 148.

In some embodiments, it is not necessary that block 102 involve receiving concept drawing 104 or converting concept drawing 104 to 2D curves 106. In some embodiments, obtaining 2D curves 106 in block 102 may comprise receiving such 2D curves 106 in a format suitable for further processing in the remainder of method 100 (rather than processing concept drawings 104 to obtain 2D curves 106). In such embodiments, 2D curves 106 may be received as a part of block 102 from some other source (e.g. via input 22 or network interface 24 of computer 12 (FIG. 2) and/or the like) which may provide 2D curves 106 in a suitable format for processing in the remainder of method 100.

Method 100 then proceeds to block 108 which comprises obtaining user input 110 relating to 2D curves 106. User input 110 may be obtained in block 108 via input 22 of computer 12 (FIG. 2) or any other suitable technique. In one particular embodiment, user interface 18 prompts user 40 for user input 110. In some particular embodiments, user input 110 obtained in block 108 comprises: a characterization of each curve (or each curve segment) in 2D curves 106 as one of: a cross-section, a trim curve or a silhouette; and, optionally, an assignment of a layer index to each curve (or each curve segment) (e.g. in cases where 2D curves 106 include disconnected networks). In some particular embodiments, user input 110 obtained in block 108 comprises: a characterization of each location where 2D curves 106 intersect as an actual intersection (e.g. corresponding to a 3D intersection) or a non-intersection (e.g. a location where two curves belonging to different layers intersect (e.g. because of occlusions or the like)); and, optionally, an assignment of a layer index to each curve (or each curve segment) (e.g. in cases where 2D curves 106 include disconnected networks).

In some embodiments, user input 110 can also comprise, for each actual intersection or some subset of intersection(s), an indication of directionality of a surface normal at the intersection (e.g. concavity or convexity). In some embodiments, such directionality may be assigned as a part of block 102 and the block 108 user input 110 may comprise switching one or more of the block 102 assignments if the block 102 assignments do not correspond to the shape of the object underlying concept drawing 104. In some embodiments, the object underlying concept drawing 104 is globally symmetric about one or more symmetry planes. In such cases, a user may annotate 2D curves 106 to indicate one or more curves of global symmetry. In such cases, 2D curves 106 and/or concept drawing 104 may correspond to one symmetric half of the symmetric object. Once 3D curves 116 are generated by method 100 for symmetric half of the symmetric object, then the 3D curves may be mirrored about the curve(s) of global symmetry. Taking advantage of global symmetry may reduce the effort required for user input (in block 108) and may also reduce user effort in circumstances where a user is drawing concept drawing 104, since a user may only provide user input for, and/or draw, a symmetric half of the symmetric object.

After obtaining user input 110 in block 108, the remainder of method 100 comprises determining three-dimensional representations 116 of 2D curves 106 based on 2D curves 106 and, in some cases, user input 110, wherein the three-dimensional representations 116 are most (or at least acceptably) consistent with the intention of the artist regarding the three-dimensional object underlying concept drawing 104. Since 2D curves 106 are representative of concept drawing 104 and such three-dimensional representations 116 (for brevity, 3D curves 116) are based on 2D curves 106, 3D curves 116 determined according to the remainder of method 100 are representative of the three dimensional shape of the object underlying concept drawing 104. In some embodiments, where 2D curves 106 comprise spline representations characterized by control points (e.g. splines made of piecewise Bézier segments, B-splines and/or the like), the remainder of method 100 may comprise determining three-dimensional coordinates for each of the Bézier control points in 2D curves 106 and outputting such 3D control point coordinates as 3D curves 116. In some embodiments, there is a one to one correspondence between the 2D control points of 2D curves 106 and the 3D control points of 3D curves 116. In such embodiments, the remainder of method 100 comprises determining 3D coordinates for each of the control points in 2D curves 106.

As discussed above, in some embodiments, 2D curves 106 are represented by the Bézier control points $\overline{B}_{0 \ldots 3}^i$ of corresponding Bézier segments $\overline{\beta}^i$. In such embodiments, 3D curves may be represented by the 3D control points of corresponding 3D Bézier segments. In this description, the $i^{th}$ Bézier segment of a 3D curve (e.g. a curve within 3D curves 116 generated by method 100) may be designated herein by $\beta^i$, with its control points designated as $B_{0 \ldots 3}^i$. In some embodiments, where 3D curves 116 comprise 3D Bézier control points $B_{0 \ldots 3}^i$, such 3D Bézier control points $B_{0 \ldots 3}^i$ may be specified using the (x,y,z) coordinates of a Cartesian coordinate system.

Method 100 proceeds from block 108 to 112. Block 112 comprises determining an energy function (also referred to as an objective function or cost function) and corresponding constraints which will be used to perform an optimization in block 114. In some embodiments, blocks 112, 114 involve using a number of properties which are common to concept drawings to determine the energy function and/or to perform the optimization. Some of these properties of concept drawings are discussed below.

One property of concept drawings (which may be referred to as projection accuracy) is that concept drawings are typically intended to represent accurate 2D projections of the 3D shape of the underlying object. This observation implies that one would expect 3D curves 116 (when projected to a 2D viewing plane) to align reasonably closely with 2D curves 106. Another property of concept drawings (which may be referred to as minimal variation or minimal 2D-to-3D variation) is that artists tend to draw concept drawings using non-accidental viewpoints which are selected to convey information about three-dimensional shape and/or to minimize foreshortening. This observation implies that the shape of 3D curves 116 should reasonably closely reflect the shape of corresponding 2D curves 106. In some embodiments, this minimal variation observation implies that continuous 2D curves 106 should result in continuous 3D curves 116. In some embodiments, this minimal variation observation implies that 2D curves 106 and 3D curves 116 are locally affine invariant. For example, the shape (and/or curvature) of curves in 3D should as much as possible reflect the shape (and/or curvature) of the corresponding 2D curve; for instance, straight line segments in 2D should generally correspond to straight line segments in 3D.

Another property of concept drawings, is that the curves representing concept drawings exhibit ambiguities. One ambiguity associated with concept drawings is that the curve geometry alone does not provide sufficient information to distinguish actual intersections from occlusions or the like. Artists typically use different conventions, such as dashed lines, faint lines or the like, to depict occlusions. In some embodiments, this ambiguity can be removed via user input received in block 108, which may include layer indices and/or indications that particular intersections are not actual intersections. Another ambiguity associated with concept drawings is a convex/concave global ambiguity which allows for different global interpretations. In some embodiments, this convex/concave ambiguity is resolved by favoring more convex shapes viewed from above. One non-limiting example of a technique for resolving the convex/concave ambiguity is disclosed by Shao et al., 2012, Cross-shade: Shading concept sketches using cross-section curves.

*ACM Trans. Graphics* 31, 4 and U.S. patent application No. 61/829,864 filed 31 May 2013 (together, referred to herein as Shao et al.), both of which are hereby incorporated herein by reference. As discussed above, in some embodiments, this (or some other) convex/concave ambiguity-removal technique is used in block 102 and block 108 may allow user input 110 to switch one or more of the block 102 assignments if the block 102 assignments do not correspond to the shape of the object underlying concept drawing 104. In some embodiments, the convex/concave ambiguity can be removed entirely or in part by user input.

Another property of concept drawings (which may be referred to herein as conjugacy) is that sketched flow lines are often aligned with sharp features and lines of curvature, wherein principal lines of curvature form a so-called conjugate network of curves over surfaces of the underlying object. This observation implies that one would expect that the four corners of four-sided regions bounded by 3D curves 116 would tend to be approximately planar if the network of 3D curves 116 is sufficiently dense. This property is shown in FIGS. 5A and 5B. FIG. 5A is a schematic depiction of an exemplary set of 2D curves 150 corresponding to an underlying exemplary concept drawing 152. 2D curves 150 comprise a network of individual 2D curves which define a four-sided region 154 which is bounded on its four sides by intersecting 2D curves. FIG. 5B schematically depicts a number of 3D curves 156 which demonstrate the conjugacy property of concept drawings, where when region 154 is brought into three dimensions, the corners 154A-154D of four-sided region 154 are expected to be close to coplanar, provided the network of 2D curves 150 is sufficiently dense.

Another property of concept drawings (which may be referred to as shape regularity or regularity) relates to how viewers perceive the 3D characteristics of 2D curves associated with concept drawings. Shape regularity may include a number of sub-categories of observations, including without limitation:

orthogonality—this observation (based on perceptual studies) indicates that observers tend to interpret intersecting smooth curves (which may be referred to herein as smooth crossings) as being aligned with the lines of curvature of an imaginary surface and, consequently, have orthogonal tangents at the intersection point. Other intersections (i.e. intersections other than smooth crossings) may have orthogonal tangents or may be indicative of other geometric features, such as, by way of non-limiting example, sharp edges, silhouettes and/or the like.

parallelism—this observation posits that artists tend to strategically place intersecting 2D curves along a given curve such that the tangents of intersecting curves at adjacent intersections along a given curve are frequently parallel and that this parallelism extends to 3D curves and corresponding 3D tangents.

symmetry—this observation observes that designers tend to draw curves which emphasize intrinsic shape properties like local symmetries. Curves that indicate symmetry may be referred to as geodesics. Not all curves are geodesics and not all concept drawings have geodesic curves.

curve planarity—this observation posits that artists tend to draw curves over smooth surfaces where the curves are globally planar (i.e. where each curve fits on a 3D plane). Curves exhibiting this property may be referred to as planar curves. Curve planarity also relates to the principle of minimal variation discussed above, since planar curves are affine invariant under near orthographic projections. It will be appreciated that not all curves used in concept drawings are planar curves. For some objects, concept drawings will include non-planar curves. Planar curves, where present, may facilitate more global regularities, such as curve parallelism and orthogonality.

curve linearity—this observation posits that artists may intend for some 2D curves to be straight lines.

These regularity cues are generally context based i.e. they may or may not apply in any particular instance.

Another property of concept drawings is that they are commonly drawn by hand, and therefore may include inaccuracies. Viewers tend to account for these inaccuracies and perceive 2D curves (and/or their corresponding 3D curves) as more closely conforming to regular shapes than is actually the case in a typical hand-drawn concept drawing. In some embodiments, the projection (e.g. orthographic projections) of reconstructed 3D curves is permitted to deviate from the 2D concept drawing to correct for these inaccuracies and/or to satisfy geometric constraints (e.g. regularity, conjugacy, etc.). The processes by which these deviations may be corrected for are referred to herein as "input approximation". Corrections introduced by input approximation may be modeled and balanced against other optimized terms in the energy function of blocks 112, 114. For example, some embodiments may attempt to balance input correction against the preference for minimal variation by minimizing corrections which change curve shape and more readily implementing corrections which change curve location.

Returning to method 100 (FIG. 3), method 100 proceeds to block 112 which involves determining an energy function and, optionally in some embodiments, one or more constraints. The block 112 energy function and constraints may be based on one or more of the aforementioned observations about concept drawings and their corresponding 2D curves. Determining the energy function and constraints in block 112 may comprise applying the general terms described herein to 2D curves 106 obtained in block 102 and may comprise using user input 110 obtained in block 108. For example, a user (e.g. via user interface 18) may: annotate curves as cross-sections, trims, or silhouettes; provide layer annotations to identify occlusions and/or disconnected networks of curves; draw (or otherwise provide) occluded or otherwise hidden parts of a cross-section; define symmetry planes (i.e. planes about which the reconstructed 3D curves should be symmetric); and/or provide other information about 2D curves 106. Such user input, if provided, may be used in method 100 to add curve information, clarify ambiguities, and/or introduce additional constraints in block 112.

Figures 6, 9:
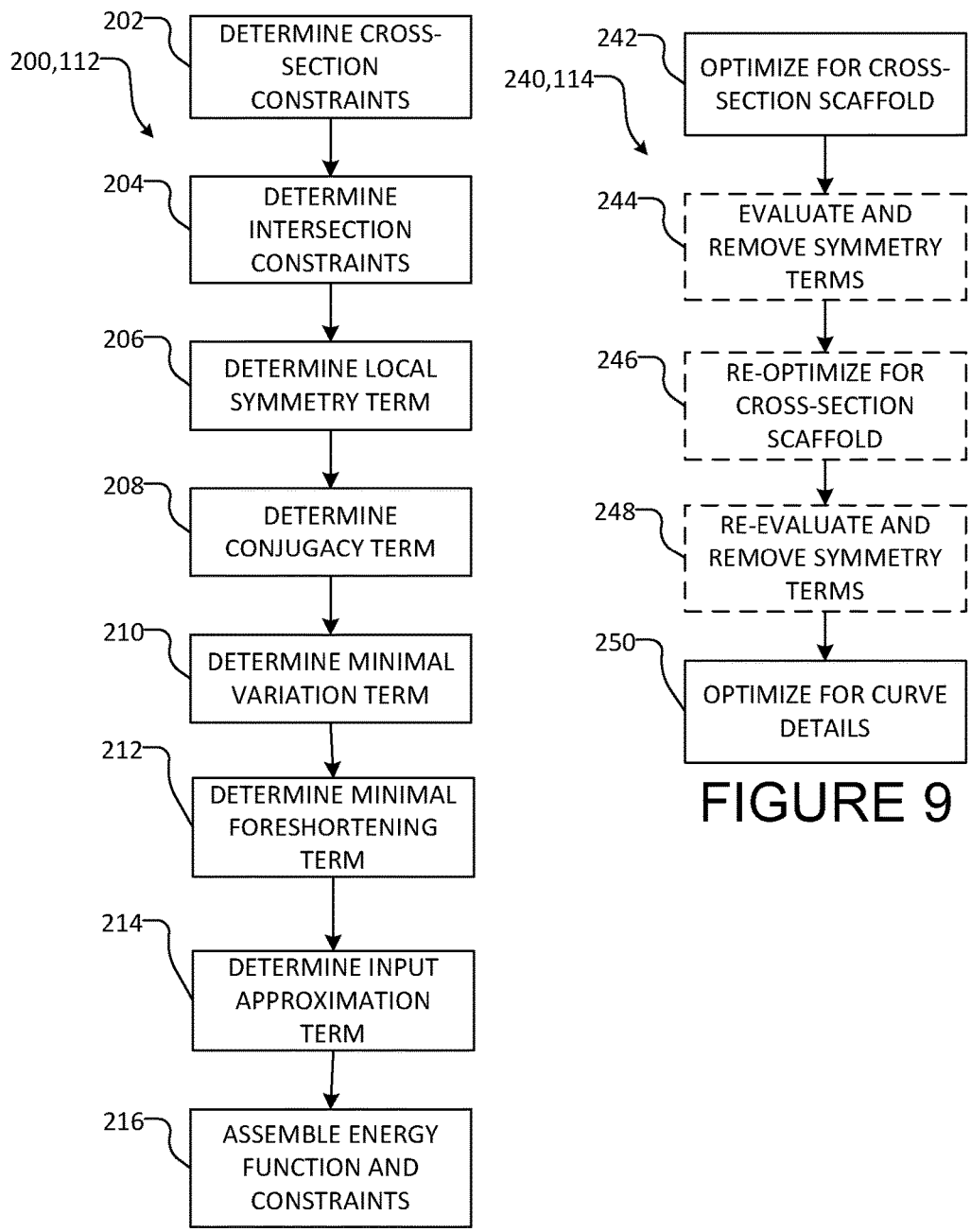
FIG. 6 is a block diagram representation of a method for determining an energy function and constraints which may be used in the method of FIG. 3 according to a particular embodiment.
FIG. 9 is a block diagram representation of a method for optimizing an energy function to determine 3D curves which may be used in the method of FIG. 3 according to a particular embodiment.

FIG. 6 is a block diagram representation of a method 200 for determining an energy function and constraints according to a particular embodiment. In some embodiments, method 200 of FIG. 6 may be used to implement block 112 of method 100 (FIG. 3). Method 200 may be performed by computer 12 (e.g. by processor 14) of system 10 (FIG. 2). Method 200 may be suited for when user input 110 comprises (and/or is limited to): a characterization of each curve (or each curve segment) in 2D curves 106 as one of: a cross-section, a trim curve or a silhouette; optionally, an assignment of a layer index to each curve (or each curve segment) (e.g. in cases where 2D curves 106 include disconnected networks); and, optionally, an indication of directionality of surface normals at curve intersections.

Method 200 commences in block 202 which comprises determining constraints for the various 3D cross-section curves to be determined in 3D curves 116. As discussed above, user input 110 may indicate which of 2D curves 106 are cross-sections. In some embodiments, block 202 comprises determining a constraint that each cross-section curve c must be a planar curve. In embodiments where 2D curves 106 and corresponding curves 116 are represented by control points, constraining a cross-section curve c to be a planar curve may comprise constraining the control points of the curve to be co-planar. In terms of 3D Bézier segments $\beta^i$, this constraint can be expressed as constraining the control points $B_k^i$ of each Bézier segment $\beta^i$ on the same curve c to satisfy the plane equation:

$$B_k^i \cdot n^c + d^c = 0 \quad (1)$$

where $n^c$ and $d^c$ are the unknown plane normal and offset respectively of the plane on which the cross-section curve c is located. In some embodiments, the number of unknowns in equation (1) can be reduced by setting the z component of the normals $n^c$ to be unity (instead of enforcing the normals $n^c$ to be of unit length). This renormalization may be used in circumstances where there is no cross-section plane that is orthogonal to the (x,y) view plane—circumstances that are consistent with the notion of non-accidental view points in the minimal variation observation discussed above.

Method 200 then proceeds to block 204 which comprises determining intersection constraints for the various intersecting cross-sectional curves for the various 3D cross-section curves to be determined in 3D curves 116. As discussed above, user input 110 may indicate which of 2D curves 106 are cross-sections and so the intersections of cross-sectional curves among 2D curves 106 may be known. In some embodiments, block 204 comprises determining one or more constraints for each intersection pair of cross-section curves c, c'. In some embodiments, block 204 involves determining, for each intersection between a pair of cross-section curves c, c', an orthogonal plane constraint:

$$n^c \cdot n^{c'} = 0 \quad (2)$$

which enforces a constraint that at an intersection between planar cross-section curves c, c', the corresponding planes are orthogonal. In some embodiments, block 204 involves determining, for each intersection between a pair of cross-section curves c, c', an orthogonal tangent constraint which enforces a constraint that the tangents of the curves c, c' at the intersection be orthogonal. In embodiments, where curves c, c' are represented by Bézier splines and the intersection is at Bézier control points $B_0^i$, $B_0^j$, the tangents at the intersection are the vectors between the Bézier control points $B_0^i$, $B_0^j$ and the neighboring control points on each curve c, c'. This may be expressed as:

$$(B_1^i - B_0^i) \cdot (B_1^j - B_0^j) \quad (3)$$

Method 200 then proceeds to block 206 which involves determining a local symmetry term which, in some embodiments, may be incorporated into the block 112 energy function. In some embodiments, user input 110 may specify which of 2D curves 106 are geodesic cross-section curves, but this is not necessary. If a cross-section curve c defines a local symmetry plane at an intersection with another cross-section curve c', then the tangent of the intersecting curve c' will be collinear with the normal $n^c$ (i.e. the plane on which geodesic curve c resides). In terms of Bézier control points, this property may be expressed as:

$$\|n^c \times (B_1^j - B_0^j)\| = 0 \quad (4a)$$

where $(B_1^j - B_0^j)$ is the control point representation of the tangent to the curve c' at the location where it intersects the curve c.

In some embodiments, user input 110 does not specify which of cross-section curves among 2D curves 106 are geodesics. Consequently, in such embodiments, it is undesirable to rigidly enforce equation (4a) (i.e. as a rigid constraint). Instead, in some embodiments, block 206 may comprise determining a symmetry term which may be incorporated into an energy function which is optimized in block 114 (FIG. 3). In some embodiments, the block 206 symmetry term may have the form:

$$C_{sym}(c,c') = \Sigma_{c,c'} \|n^c \times (B_1^j - B_0^j)\|^2 \quad (4b)$$

where the equation (4b) summation ranges over the set of cross-section intersections between cross-section curves c and intersecting cross-section curves c' and $(B_1^j - B_0^j)$ is the control point representation of the tangent to the curve c' at the location where it intersects the curve c. In some embodiments, the equation (4b) summation may exclude intersections at trim curves and/or other non-cross-section curves; symmetry at such excluded intersections may, for example, be accounted for via the conjugacy term.

Figures 7A, 7B, 7C:
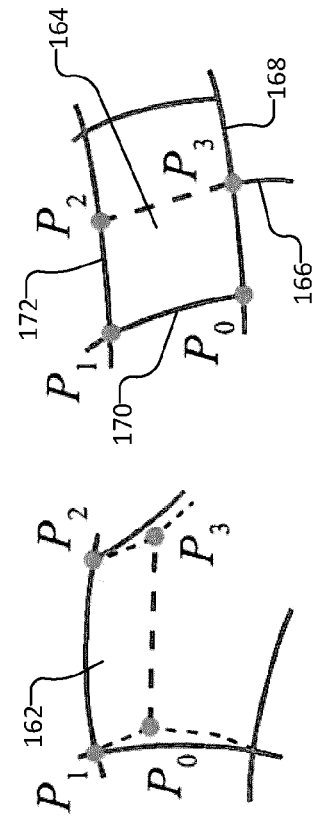
FIGS. 7A-7C schematically depict a number of different types of four-sided regions to which the conjugacy principle may be applied when determining the conjugacy term as a part of the method of FIG. 6 according to a particular embodiment.

Method 200 then proceeds to block 208 which comprises determining a conjugacy term which, in some embodiments, may be incorporated into the block 112 energy function. As discussed above, the conjugacy property of concept drawings implies that one would expect the four corners of four-sided regions bounded by 3D curves 116 would tend to be approximately planar if the network of 3D curves 116 is sufficiently dense. FIG. 7A shows a four-sided region (also referred to as a four-sided cycle) 160 whose corners $P_0$, $P_1$, $P_2$, $P_3$ are located at intersections of 3D curves 116. For four-sided region 160, the conjugacy property can be expressed in the form:

$$a_0 P_0 + a_1 P_1 + a_2 P_2 + a_3 P_3 = 0 \quad (5a)$$

In some embodiments, the coefficients $a_i$ may be determined using the minimal variation principle described above. If we assume that the proportions of four-sided region 160 do not change significantly during the 2D to 3D conversion, then the coefficients $a_i$ may be solved for in 2D curves 106 by satisfying equation (5a) and normalizing the sum $\Sigma_{i=0}^3 a_i$ to unity.

While the conjugacy principle implies that the four corners of four-sided regions bounded by 3D-curves 116 (like four-sided region 160 of FIG. 7A) should be close to planar, it does not mandate that they are exactly planar. Consequently, block 208 may comprise determining a conjugacy term which may be incorporated into an energy function which is optimized in block 114 (FIG. 3). In some embodiments, the block 208 conjugacy term may have the form:

$$C_{conj} = \Sigma_{\{(P_0, P_1, P_2, P_3)\}} \|a_0 P_0 + a_1 P_1 + a_2 P_2 + a_3 P_3\|^2 \quad (5b)$$

where $P_0$, $P^1$, $P_2$, $P_3$ represent the corners of a four-sided region and where the equation (5b) summation ranges over the set of all such four-sided regions.

In some embodiments, each individual four-sided region may be assigned a weight within the block 208 conjugacy term (e.g. a weight may be assigned to each elements in the equation (5b) sum). Such weights may be based on the sizes of the four-sided regions. In one particular embodiment, the weight for each four-sided region may be determined by a Gaussian function which depends on its size. In one particular embodiment, this weight w may be provided by:

$$w = e^{-(d/2\sigma)^2} + \varepsilon \quad (6)$$

where d represents the longest diagonal in the four-side region in 2D and $\sigma$ is set to some suitable fraction (e.g. ⅓)

of the diagonal of a bounding box corresponding to the four-sided region in 2D and ε is set to some suitable constant (e.g. 0.01).

In some embodiments, block 208 may comprise generating conjugacy terms for four-sided regions which have a finer granularity (e.g. are smaller than) the four-sided regions bounded by 3D curves 116. FIG. 7B schematically depicts a four-sided region 162 which is defined by four points $P_0$, $P_1$, $P_2$, $P_3$ where: two points $P_1$, $P_2$ are two consecutive corners on a four-sided region bounded by 3D curves 116 (e.g. a four-sided region 160 of the type shown in FIG. 7A); and the other two points $P_0$, $P_3$ are defined by the tangents to the curves which intersect $P_1$, $P_2$. Four-sided region 162 may be thought of as sweeping the curve between $P_1$, $P_2$ along the sides to generate an intermediate curvature line (i.e. the line between $P_0$, $P_3$). FIG. 7C schematically depicts a four-sided region 164 which is defined by four points $P_0$, $P_1$, $P_2$, $P_3$ where: $P_3$ is at a T-junction between a pair of 3D curves 166, 168; $P_0$ is a point at a preceding or subsequent intersection along curve 168 (which provided the top portion of the T-junction); $P_1$ is the next intersection on the curve 170 which forms the intersection with curve 168 at $P_0$; and $P_2$ is a fourth point on the curve 172 which form the intersection with curve 170 at $P_1$ and $P_2$ is located along curve 172 such that the arc length along curve 172 between points $P_1$, $P_2$ is the same as the arc length along curve 168 between points $P_3$, $P_0$.

In some embodiments, the block 208 conjugacy term may incorporate these types of four-sided regions having finer granularity (e.g. four-sided regions similar to the four-sided regions 162, 164 shown in FIG. 7B and/or FIG. 7C). In some embodiments, the block 208 conjugacy term may be based on the equation (5b) expression $C_{conj} = \Sigma_{\{(P_0,P_1,P_2,P_3)\}} \|a_0 P_0 + a_1 P_1 + a_2 P_2 + a_3 P_3\|^2$ where the summation ranges over each four-sided region, including those of the type shown in FIG. 7A (i.e. defined between 3D curves 116) and the finer granularity types shown in FIGS. 7B and/or 7C. In some embodiments, each such four-sided region may be weighted by a corresponding weight within the block 208 conjugacy term (e.g. a weight may be assigned to each elements in the equation (5b) sum). Such weights may be based on the size of the four-sided region (e.g. in accordance with equation (6)) or some other suitable function).

After determining the conjugacy term in block 208, method 200 proceeds to block 210 which comprises determining a minimal variation term which, in some embodiments, may be incorporated into the block 112 energy function. As discussed above, the minimal variation property of concept drawings implies that the 2D shape of each of 2D curves 106 should be generally reflected in the shape of each of 3D curves 116. Where 2D curves 106 and 3D curves 116 are represented by piecewise splines (e.g. Bézier splines) comprising corresponding control points, the expectations of minimal variations can be restated in terms of relations between consecutive control points along each curve.

Figures 8A, 8B:
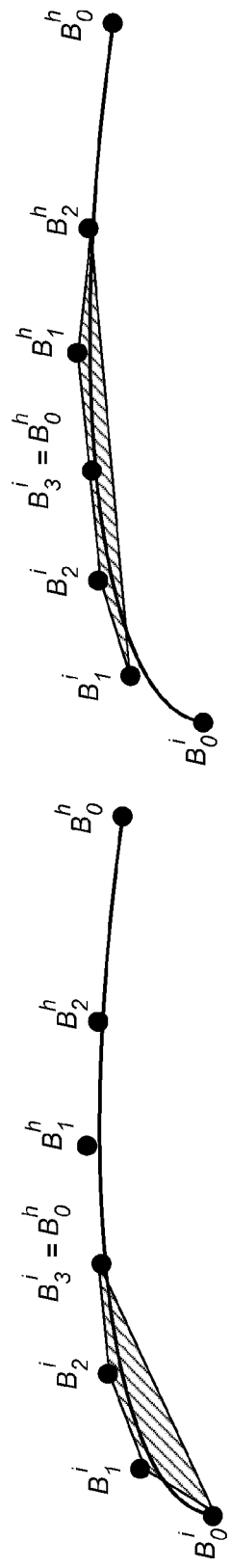
FIGS. 8A and 8B schematically depict a number of types of control points which may be used in determining the minimal variation term as a part of the method of FIG. 6 according to a particular embodiment.

In some embodiments, the block 210 minimal variation term comprises a sum, over each set of four non-co-linear Bézier control points on each 3D Bézier segment $\beta^i$ (as shown in FIG. 8A), of the form:

$$C_{mv\_a}(\beta^i) = \Sigma_i \|a_0 B_0^i + a_1 B_1^i + a_2 B_2^i + a_3 B_3^i\|^2 \quad (7a)$$

where the coefficients $a_0$, $a_1$, $a_2$, $a_3$ are determined using a technique similar to that described above in connection with equation (5a) and curve conjugacy.

In some embodiments, the block 210 minimal variation term comprises a sum, over each set of four non-co-linear Bézier control points over each pair of adjacent Bézier segments $\beta^i$, $\beta^h$ (as shown in FIG. 8B), of the form:

$$C_{mv\_b}(\beta^i,\beta^h) = \Sigma_{i,h} \|a'_0 B_1^i + a'_1 B_2^i + a'_2 B_1^h + a'_3 B_2^h\|^2 \quad (7b)$$

where non-co-linear Bézier control points $B_1^i$, $B_2^i$ are on segment $\beta^i$ on a first side of the shared control point $B_3^i = B_0^h$ and non-co-linear Bézier control points $B_1^h$, $B_2^h$ are on segment $\beta^h$ on the other side of the shared control point $B_3^i = B_0^h$ and where the coefficients $a'_0$, $a'_1$, $a'_2$, $a'_3$ are determined using a technique similar to that described above in connection with equation (5a) and curve conjugacy.

In some embodiments, a set of three control points ($B_0$, $B_1$, $B_2$) on a single spline (as in the FIG. 8A scenario) or a set of three control points ($B_0$, $B_1$, $B_2$) spanning a pair of adjacent splines (as in the FIG. 8B scenario) will be co-linear. In these circumstances, the block 210 minimal variation term may comprise a term of the form:

$$c_{col} = \Sigma_{\{(B_0,B_1,B_2)\}} \|B_1 - (c_1 B_0 + c_2 B_2)/(c_1+c_2)\|^2 \quad (8)$$

where: the coefficients $c_1$, $c_2$ may be set to the inverse of the distances between $B_1$ and $B_0$ and between $B_1$ and $B_2$ in 2D; and the equation (8) summation ranges over the set of triplets of co-linear control points on the same curves. Note that triplets of co-linear control points represented by equation (8) are not limited to the same Bézier spline (FIG. 8A scenario) and may span a pair of adjacent splines (FIG. 8B scenario) on the same curve.

In some embodiments, block 210 may comprise determining a minimal variation term which may be incorporated into an energy function which is optimized in block 114 (FIG. 3). In some embodiments, the block 210 minimal variation term may be based on the equations (7a), (7b) and (8), in each of the circumstances discussed above. In some embodiments, each term in the summations of equations (7a) and (7b) may be assigned a weight within the block 210 minimal variation term—e.g. such weights may be assigned to each set of four non-co-linear Bézier control points on each 3D Bézier segment $\beta^i$ (equation (7a)) and each set of four non-co-linear control points spanning a pair of adjacent Bézier segments $\beta^i$, $\beta^h$ (equation (7b)). Such weights may be based on the distances d between the most distal of the 2D control points in the individual terms within the sums of equations (7a), (7b), (8). In some embodiments, such weights may be based on a Gaussian function of these distances d. In some embodiments, such weights may be based on an equation similar to equation (6), where d is evaluated to be the distance between the most distal of the 2D control points of each term.

Method 200 then proceeds to block 212 which comprises determining a minimal foreshortening term which, in some embodiments, may be incorporated into the block 112 energy function. The block 212 minimum foreshortening term may be used to indicate a preference for minimally foreshortened reconstructions (e.g. minimally foreshortened 3D curves 116). In some embodiments, where 3D curves 116 are represented by piecewise splines (e.g. Bézier splines) comprising corresponding control points, the block 212 minimal foreshortening term may comprise a sum, over cross-section intersections, of the form:

$$C_{fs} = \Sigma_{\{ai\}} \|B_{int}(z) - B_{adj}(z)\|^2 \quad (9a)$$

where: $B_{int}(z)$ is the z coordinate of a Bézier control point at an intersection, $B_{adj}(z)$ is the z coordinate of a Bézier control point at an adjacent intersection on the same curve. The equation (9a) summation may range over the set {ai} of pairs of adjacent intersections on all curves. In some embodiments, the equation (9a) summation may range over the set {ai} of pairs of adjacent intersections on all cross-section curves.

In some embodiments, where 3D curves 116 are represented by piecewise splines (e.g. Bézier splines) comprising corresponding control points, the block 212 minimal foreshortening term may comprise a sum, over Bézier curves i and over control points k thereon, of the form:

$$C_{fs} = \Sigma_{i,k} \|B_k^i(z) - B_{k+1}^i(z)\|^2 \quad (9b)$$

where $B_k^i(z)$ represents the z coordinate of a $k^{th}$ Bézier control point on a Bézier segment i, $B_{k+1}^i(z)$ represents the z coordinate of an adjacent Bézier control point on a Bézier segment i. Where the Bézier splines are cubic, the variable k in equation (9b) is permitted to range between k=0-2 for each segment i. The equation (9b) summation index i may range over the set of all Bézier segments. In some embodiments, the equation (9b) summation index i may range over the set of all Bézier segments on cross-section curves.

In some embodiments, each term in the summation of equation (9) may be assigned a weight within the block 212 minimal foreshortening term—e.g. such weights may be assigned to each individual pair of control points evaluated according to equation (9). Such weights may be based on the distances d between the 2D control points in the individual terms of equation (9). In some embodiments, such weights may be based on a Gaussian function of these distances d. In some embodiments, such weights may be based on an equation similar to equation (6), where d is evaluated to be the distance between the 2D control points of each term.

Method 200 then proceeds to block 214 which comprises determining an input approximation term which, in some embodiments, may be incorporated into the block 112 energy function. The block 214 input approximation term may be used to indicate a preference for minimum re-projection error between 3D curves 116 and 2D curves 106. In some embodiments, where 3D curves 116 are represented by piecewise splines (e.g. Bézier splines) comprising corresponding control points, the block 212 minimal foreshortening term may comprise a sum, over each of 2D curves 106 and corresponding 3D curves 116, of the form:

$$C_{app} = \Sigma_{i,k} \|(B_{k+1}^i(x,y) - B_k^i(x,y)) - (\overline{B}_{k+1}^i(x,y) - \overline{B}_k^i(x,y))\|^2 \quad (10)$$

where the summation index i ranges over the set of spline segments of 2D and 3D curves 106, 116 and the summation index k ranges over the set of valid control points on each segment (e.g. from 0-2 (in the case of cubic Bézier segments)). It will be appreciated that the equation (10) expression relates the shape of the edges of the 2D Bézier segment polygon edges (e.g. the edges between 2D control points) to the re-projection of the 3D Bézier polygon edges back to 2D (e.g. to the (x,y) view plane).

In some embodiments, each term in the summation of equation (10) may be assigned a weight within the block 214 input approximation term—e.g. such weights may be assigned to each edge evaluated using equation (10). Such weights may be based on the distances d between the 2D control points which define the edge in each term of the equation (10) summation—i.e. $\|(\overline{B}_{k+1}^i(x,y) - \overline{B}_k^i(x,y))\|$. In some embodiments, such weights may be based on a Gaussian function of these distances d. In some embodiments, such weights may be based on an equation similar to equation (6), where d is evaluated to be the distance between the 2D control points which define the edge.

In some embodiments, the block 214 input approximation term may additionally or alternatively incorporate a term that relates the positions of the projections of the 3D control points (rather than their edges) to the positions of the 2D control points. In some embodiments, where 3D curves 116 are represented by piecewise splines (e.g. Bézier splines) comprising corresponding control points, the block 212 minimal foreshortening term may additionally or alternatively comprise a sum, over each of 2D curves 106 and corresponding 3D curves 116, of the form:

$$C_{pos} = \Sigma_{i,k} \|(B_k^i(x,y) - \overline{B}_k^i(x,y))\|^2 \quad (11)$$

where the summation index i ranges over the set spline segments of 2D and 3D curves 106, 116 and the summation index k ranges over the set of valid control points on each segment (e.g. from 0-3 (in the case of cubic Bézier segments)).

Method 200 then proceeds to block 216 which comprises determining an energy function which may be used in the block 114 optimization (FIG. 3). In some embodiments, block 216 may optionally involve determining one or more constraints for the block 114 optimization. The block 216 energy function may be based on any one or more of the terms determined in blocks 202-214. For example, the blocks 216 energy function may comprise one or more of: a term reflective of a preference for cross-section curves to be planar curves (block 202); a term reflective of a preference for the planes of planar curves to be orthogonal at cross-section intersections (block 204); a term reflective of a preference for curve tangents at cross-section intersections to be orthogonal (block 204); a term reflective of a preference for a 3D curve to be a geodesic (e.g. to indicate local symmetry (block 206)); a term reflective of a preference for conjugacy between four-sided regions (which may include four-sided regions bounded by 3D curves and/or finer granularity four-sided regions (block 208)); a term reflective of a preference for minimal variation in shape along the 3D curves when compared to the 2D curves (block 210); a term reflective of a preference for minimal foreshortening in the 3D curves (block 212); a term reflective of a preference for re-projection of 3D curves to 2D which preserves the edge shapes of the edges between control points of the original 2D curves (block 214); and/or a term reflective of a preference for re-projection of control points of 3D curves to 2D which preserve the locations of the original 2D control points (block 214).

In some embodiments, the block 216 energy function comprises any plurality of these terms. In some embodiments, the block 216 energy function comprises any three or more of these terms. In some embodiments, the block 216 energy function comprises a term reflective of a preference for minimal variation in shape along the 3D curves when compared to the 2D curves (block 210) on its own and/or in combination with any one or more of the other terms. In some embodiments, the block 216 energy function comprises a term reflective of a preference for conjugacy between four-sided regions (which may include four-sided regions bounded by 3D curves and/or finer granularity four-sided regions (block 208)) on its own and/or in combination with any one or more of the other terms.

In some embodiments, each of the terms determined to be part of the block 216 energy function may be assigned a corresponding weight. In some embodiments, equal weights may be assigned to the terms that indicate preferences for symmetry (e.g. $C_{sym}$), conjugacy (e.g. $C_{conj}$) and minimal variation along non-co-linear control points ($C_{mv\_a}(\beta^i)$ and/or $C_{mv\_b}(\beta^i, \beta^h)$). In some embodiments, relatively high weight may be assigned to the term that indicates a preference for minimal variation along co-linear control points ($C_{col}$). In some embodiments, relatively low weight may be assigned to the terms that indicate preferences for minimal foreshortening ($C_{fs}$). In some embodiments, the weights assigned to the input approximation terms ($C_{app}$, $C_{pos}$) may be configured (e.g. user configured or empirically configured) on a basis of confidence in 2D curves 106. In some embodiments, the weight assigned to $C_{app}$ is significantly larger (e.g. 100 times) the weight assigned to $C_{pos}$.

In some embodiments, one or more of the terms reflective of a preference for cross-section curves to be planar curves (block 202), reflective of a preference for the planes of planar curves to be orthogonal at cross-section intersections (block 204) and reflective of a preference for curve tangents at cross-section intersections to be orthogonal (block 204) may be determined to be constraints rather than being incorporated into the energy function. For example, block 216 may comprise determining rigid constraints in the form of equations (1), (2) and (3). In some embodiments, these terms may be incorporated into the energy function with relatively high weights that make them behave, in the block 114 optimization, in a manner similar to constraints.

In some embodiments, the block 216 energy function may comprise an additional term which may reflect a preference for 3D curves 116 to be relatively close to the origin of the 3D coordinate system used to characterize these curves. In one particular embodiment, this term may have the form:

$$C_{stab} = \Sigma_c (d^c)^2 \quad (12)$$

where the equation (12) summation ranges over the set of planar cross-section curves c and $d^c$ is the offset of the plane of planar curve c (as defined above above in equation (1)). This term of the block 216 energy function which reflects a preference of being close to the origin may be give relatively low weight as compared to any of the other terms originating from blocks 202-214.

Returning to method 100 (FIG. 3), after the energy function and optional constraints are determined in block 112, method 100 proceeds to block 114 which may comprises performing an optimization (also referred to as running a solver) which minimizes the block 112 energy function or augmented version(s) of the block 112 energy function (as applied using user input 110 and 2D curves 106) to thereby determine 3D curves 116. In some embodiments where 2D curves 106 are represented by piecewise splines (e.g. Bézier splines) having 2D control points, the block 114 optimization may comprise determining 3D control points (e.g. 3D Bézier control points) which characterize 3D curves 116. In some embodiments, the block 114 optimization problem may optionally solve for the planes of planar cross-section curves c (e.g. the components of $n^c$, $d^c$ in equation (1)), although this is not necessary.

FIG. 9 is a block diagram representation of a method 240 for optimizing the block 112 energy function (or an augmented version(s) of the block 112 energy function) subject to optional block 112 constraints (or augmented versions of the block 112 constraints) according to a particular embodiment. In some embodiments, method 240 of FIG. 9 may be used to implement block 114 of method 100 (FIG. 3). Method 240 may be performed by computer 12 (e.g. by processor 14) of system 10 (FIG. 2). Method 240 may be suited for when user input 110 (FIG. 3) comprises (and/or is limited to): a characterization of each curve (or each curve segment) in 2D curves 106 as one of: a cross-section, a trim curve or a silhouette; optionally, an assignment of a layer index to each curve (or each curve segment) (e.g. in cases where 2D curves 106 include disconnected networks); and, optionally, an indication of directionality of surface normals at curve intersections.

Method 240 commences in block 242 which may comprise performing an optimization using (e.g. minimizing) the block 112 energy function (or augmented version(s) of the block 112 energy function) and optional block 112 constraints (or augmented version of the block 112 constraints) to solve for: the 3D locations of intersections between cross-section curves; the 3D planes corresponding to planar cross-section curves; and the 3D tangents to the cross-section curves at the cross-section intersections.

The 3D plane corresponding to a curve c may be represented by the variables $n^c$, and $d^c$ discussed above in connection with equation (1). In some embodiments, block 242 comprises expressing the tangent to a cross-section curve c at a particular intersection using the variable $t_c$ (as opposed to a control point difference described in equations (3), (4a), (4b) etc.), so that the only control points directly optimized for in block 242 are the control points at the cross-section intersections. The variable $t_c$ may represent vectors (optionally normalized) between control points at and adjacent to cross-section intersections on the curve c (for example, the vector $t_c$ may represent a vector between $B_0^i$, $B_1^i$ (where there is a cross-section intersection at $B_0^i$) and/or a vector between $B_2^i$, $B_3^i$ (where there is a cross-section intersection at $B_3^i$)). This expression for the tangents may involve changing the equation (10) expression to $C_{app} = \|t_c - \bar{t}_c\|^2$ where $\bar{t}_c$ is the 2D tangent equivalent to $t_c$. The term $t_c$ can be used at any locations where the above-described energy function terms involve control points at and adjacent to cross-section intersections (i.e. $B_0^i$, $B_1^i$ and/or $B_2^i$, $B_3^i$). In some embodiments, the block 242 optimization may comprise using a set of weights for each of its terms (e.g. for each of the terms of blocks 202-214 used in the block 112 optimization function) which may be different from those described above. For example, the weights assigned to the input approximation terms ($C_{app}$, $C_{pos}$) may be configured to be relatively high in the block 242 optimization to avoid unnecessary deviation from the input 2D curves 106.

In some embodiments, the energy function for the block 242 optimization is given by:

$$E = w_{pos}C_{pos} + w_{app}C_{app} + w_{fs}C_{fs} + w_{conj}C_{conj} + w_{mv}C_{mv} + w_{sym}C_{sym} + w_{stab}C_{stab} \quad (13)$$

where:

$C_{pos}$, $C_{app}$, $C_{fs}$, $C_{conj}$, $C_{mv}$, $C_{sym}$ and $C_{stab}$ respectively represent: a term reflective of a preference for re-projection of control points of 3D curves to 2D which preserve the positions of the original 2D control points (block 214), a term reflective of a preference for re-projection of 3D curves to 2D which preserves the edge shapes of the edges between control points of the original 2D curves (block 214), a term reflective of a preference for minimal foreshortening in the 3D curves (block 212), a term reflective of a preference for conjugacy between four-sided regions (which may include four-sided regions bounded by 3D curves and/or finer granularity four-sided regions (block 208)), a term reflective of a preference for minimal variation in shape along the 3D curves when compared to the 2D curves (block 210), a term reflective of a preference for a 3D curve to be a geodesic (e.g. to indicate local symmetry (block 206)) and a term reflective of a preference for the 3D curves to be relatively close to the origin of the 3D coordinate system; and $w_{pos}$, $w_{app}$, $w_{fs}$, $w_{conj}$, $w_{mv}$, $w_{sym}$ and $w_{stab}$ are the weights applied to the individual terms.

In some embodiments, the terms $C_{pos}$, $C_{app}$, $C_{fs}$, $C_{conj}$, $C_{mv}$, $C_{sym}$ and $C_{stab}$ may be respectively provided by equations of the form of equation (11), equation (10), equation (9a) or (9b), equation (5b), a combination of equations (7a), (7b) and (8), equation (4b) and equation (12). In some embodiments, the term Cmv may be broken down into three terms $C_{mv\_a}$, $C_{mv\_b}$, $C_{col}$ which may be respectively provide by equations of the form of equation ((7a), (7b) and (8) and which may be provided with individual weights $w_{mv\_a}$, $w_{mv\_b}$, $w_{col}$.

In some embodiments the block 242 optimization is subject to constraints. Such constraints may comprise the constraints of equations (1), (2) and (3) for example, where equation (3) may take the form $t_c \cdot t_c = 0$ after substitution of the tangent variables in place of control point differences (as discussed above).

After the block 242 optimization, method 240 proceeds to optional block 244 which comprises evaluating the individual symmetry terms (e.g. the individual terms at each cross-section intersection which make up symmetry term $C_{sym}$). In some embodiments, these individual symmetry terms are the individual terms in the equation (4b) summation. The block 244 evaluation may comprise: comparing the individual symmetry terms (evaluated using the 3D output of the block 242 optimization) to a threshold (e.g. a user-configurable or empirically configurable threshold); and, for each cross-section intersection where the evaluated symmetry term is greater than the threshold, discarding the corresponding symmetry term (from the energy function used in the remainder of method 240). This block 244 procedure avoids further optimizing symmetry at cross-sections determined to be non-symmetric.

Method 240 then proceeds to optional block 246 which comprises re-performing the block 242 optimization using (e.g. minimizing) the energy function, as modified by the block 244 removal of symmetry terms which are determined to relate to non-symmetric cross-sections. Other than for the removal of individual symmetry terms from the energy function, the block 246 optimization may be substantially similar to the block 242 optimization and may comprise solving for: the 3D locations of intersections between cross-section curves; the 3D planes corresponding to planar cross-section curves; and the 3D tangents to the cross-section curves at the cross-section intersections. It will be appreciated that if no symmetry terms are removed in block 244, then block 246 is not necessary (since it will arrive at the same result as block 242). Method 240 then proceeds to optional block 248 which comprises re-evaluating and removing the individual symmetry terms in a procedure similar to that described above in block 244, except using the 3D results of the block 246 optimization.

Method 240 then proceeds to block 250 which comprises fixing the cross-section planes determined in the last one of blocks 242, 246 and re-optimizing for the positions of cross-section control points inside the planes and for control points of trim curves. Block 250 may comprise minimizing the block 112 energy function (or augmented version(s) of the block 112 energy function) subject to constraints as discussed above. The energy function used in the block 250 optimization may be modified by removal of individual symmetry terms in block 244 and/or block 248. Also, block 250 may involve imposing an additional constraint, which requires the tangents $t_c$ at intersections of cross-sections to have the same directionality as those determined in the last one of blocks 242, 246, where (as above) the variable $t_c$ may represent vectors (optionally normalized) between control points at and adjacent to cross-section intersections on the curve c (for example, the vector $t_c$ may represent a vector between $B_0^i$, $B_1^i$ (where there is a cross-section intersection at $B_0^i$) and/or a vector between $B_2^i$, $B_3^i$ (where there is a cross-section intersection at $B_3^i$)). Using the two-part procedure involving the optimization of the cross-section scaffolding (in block 242 and/or block 246) and the optimization for the trim details (in block 250) can substantially reduce the complexity and computational resources involved in performing these optimizations.

In some embodiments, the energy function used in the block 250 optimization is of the form:

$$E = w_{pos}C_{pos} + w_{app}C_{app} + w_{conj}C_{conj} + w_{mv}C_{mv} \qquad (14)$$

where the variables of the equation (14) energy function may have similar meanings to those of the equation (13) energy function. In equation (13) above, the symmetry term $C_{sym}$ is dropped altogether. This is not necessary. In some embodiments, the individual symmetry terms that survive blocks 244 and 248 may be incorporated into the block 250 energy function. In equation (13) above, the terms $C_{fs}$, $C_{stab}$ are also dropped altogether. This is not necessary. In some embodiments, either of these terms may be incorporated into the block 250 energy function.

The output of the block 250 optimization may comprise the 3D positions of all control points (i.e. 3D curves 116) for all curves (as opposed to only at cross-section intersections (in block 242, 246). The output of block 250 may comprise the output of block 114 and method 100 (FIG. 3).

In some circumstances, the objects underlying concept drawings are highly regular and method 100 may, in some embodiments, comprise features (e.g. energy function terms and/or constraints) to take advantage of observable regularity. Such regularity may be observed based on 2D curves 106 and/or from full or partial reconstruction of 3D curves 116. For example, straight lines may be detected in 2D curves 106 by evaluating $C_{col}$ (equation (8) and comparing the result to a suitable threshold (which may be user-configurable or configured empirically). Co-linear triplets of 2D control points (e.g. those with $C_{col}$ values less than the threshold) may be considered to be co-linear in 3D and the $C_{col}$ term may be added to the energy function of the block 114 optimization (e.g. the energy functions of the optimizations in blocks 242, 246 and/or 250). In the block 114 optimization (e.g. the optimizations in blocks 242, 246 and/or 250), the $C_{col}$ terms may be given relatively high weight (as compared to other energy function terms) and the values of $c_1$ and $c_2$ may be set to those evaluated in connection with 2D curves 106.

As another example, where two tangents at adjacent intersections along a curve are close to parallel in 2D curves 106, we expect that they will also be close to parallel in 3D curves 116. Parallel tangents may be detected in 2D curves 106 by determining the angle between two neighboring tangents $t_1$, $t_2$ at neighboring intersections along a curve and comparing same to a suitable threshold angle (which may be user-configurable or configured empirically). Where the angle is less than the threshold angle for these 2D tangents $t_1$, $t_2$, a term of the form $\|t_1 - t_2\|^2$ may be added to the energy function of the block 114 optimization (e.g. the energy functions of the optimizations in blocks 242, 246 and/or 250). As still yet another example, where the block 242, 246 optimization determines that cross-section planes are nearly parallel, then such nearly parallel planes can be enforced. For example, in some embodiments, cross-section planes that are determined by the block 242, 246 optimization may be determined to be nearly parallel by performing a clustering procedure where the planes with normal within a suitable threshold angle (which may be user-configurable or configured empirically) of being aligned with one another may be grouped into a single cluster. Such nearly parallel planes of a given cluster can then be assigned a common normal (e.g. a suitable average of the normals in the cluster) which may be enforced as a constraint for the purposes of the block 250 optimization. In some embodiments, the common normal may be assigned to the parallel planes in a cluster and the block 242, 246 optimization can be repeated with an energy function term which reflects a preference for the parallel planes to remain parallel.

A concept drawing may have several different parts represented by 2D curves. A set of curves corresponding to such parts may be referred to herein as a disconnected network of curves. Such disconnected networks of curves may be handled by assigning each disconnected network a layer index which orients its z-direction relative to the other disconnected networks. The corresponding 3D curves of each layer may be chosen to be as close as possible without interpenetration and respectful of the layer order in the z-direction using a z-buffering like algorithm. In some embodiments, this may comprise: starting with all parts at the same depth; and for each pair of in front/behind parts, pulling the front component closer to the viewer on the z-axis just enough to avoid intersection.

Figure 10:
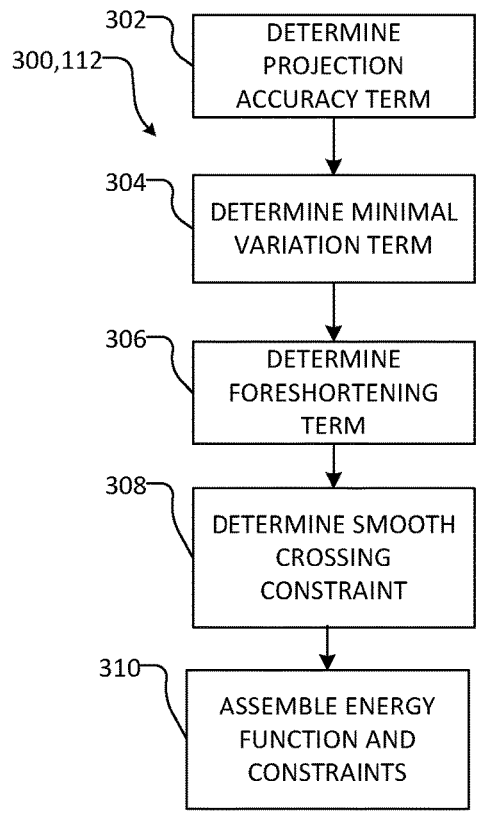
FIG. 10 is a block diagram representation of a method for determining an energy function and constraints which may be used in the method of FIG. 3 according to a particular embodiment.

FIG. 10 is a block diagram representation of another method 300 for determining an energy function and constraints according to a particular embodiment. In some embodiments, method 300 of FIG. 10 may be used to implement block 112 of method 100 (FIG. 3). Method 300 may be performed by computer 12 (e.g. by processor 14) of system 10 (FIG. 2). Method 300 may be suited for when user input 110 comprises (and/or is limited to): a characterization of each location where 2D curves 106 intersect as an actual intersection (e.g. corresponding to a 3D intersection) or a non-intersection (e.g. a location where two curves belonging to different layers intersect (e.g. because of occlusions or the like)); optionally, an assignment of a layer index to each curve (or each curve segment) (e.g. in cases where 2D curves 106 include disconnected networks); and, optionally, an indication of directionality of surface normals at curve intersections.

Method 300 commences in block 302 which comprises determining a projection accuracy term, which, in some embodiments, may be incorporated into a baseline energy function as a part of block 112. The block 302 projection accuracy term may be similar in many respects to (or the same as) the block 214 input approximation term discussed above. In some embodiments, like the block 214 input approximation term, the block 302 projection accuracy term may comprise: a term reflective of a preference for re-projection of control points of 3D curves to 2D which preserve the positions of the original 2D control points and a term reflective of a preference for re-projection of 3D curves to 2D which preserves the edge shapes of the edges (e.g. polygon edges) between control points of the original 2D curves. In one particular embodiment, the projection accuracy term may have the form $$E_{accuracy} = \qquad (15)$$

$$\sum_{i,k} w_d(d) \left\| (B_{k+1}^i(x,y) - B_k^i(x,y)) - (\overline{B}_{k+1}^i(x,y) - \overline{B}_k^i(x,y)) \right\|^2 +$$

$$\sum_{i,k} \left\| (B_k^i(x,y) - \overline{B}_k^i(x,y)) \right\|^2$$

where: the summation index i ranges over the set of spline segments of 2D and 3D curves 106, 116 and the summation index k ranges over the set of valid control points on each segment (e.g. from 0-2 (in the case of cubic Bézier segments)); and where the variable $w_d(d)$ represents a weight assigned to each edge evaluated using equation (15). Such weights may be based on the distances d between the 2D control points which define the edge in each term of the equation (15) summation—i.e. $\|(\overline{B}_{k+1}^i(x,y) - \overline{B}_k^i(x,y))\|$. In some embodiments, such weights may be based on a Gaussian function of these distances d. In some embodiments, such weights may be based on an equation similar to equation (6), where d is evaluated to be the distance between the 2D control points which define the edge, a is set using to ⅓ of the bounding box diagonal of the 2D curves 106 representing the input concept drawing 104 and ε is set to some suitable constant (e.g. 0.01).

Method 300 then proceeds to block 304 which comprises determining an minimal variation term which, in some embodiments, may be incorporated into the baseline energy function of block 112. The block 304 minimal variation term may be similar in many respects to (or the same as) the block 210 minimal variation term discussed above. In some embodiments, like the block 210 minimal variation term, the block 304 minimal variation term may comprise a term reflective of a preference for minimal variation in shape along the 3D curves when compared to the 2D curves. The block 304 minimal variation term may comprise a term reflective of a preference for 3D curves that are affine invariant. Like the block 210 minimal variation term discussed above, the block 304 minimal variation term may involve separate terms for quadruplets of adjacent control points (where no three control points are co-linear) and for triplets of adjacent co-linear control points.

As discussed above in connection with the block 210 minimal variation term, groups of four non-linear control points can be on the same 3D Bézier segment $\beta^i$ (e.g. as is the case with control points $B_0^i, B_1^i, B_2^i, B_3^i$ shown in FIG. 8A) or can be on adjacent segments $\beta^i, \beta^h$ (as is the case with control points $B_1^i, B_2^i, B_1^h, B_2^h$ shown in FIG. 8B). For each of these situations, the control point positions of the four control points may be designated $Q_0, Q_1, Q_2, Q_3$ and the affine weights $q_0, q_1, q_2$ may be determined to satisfy:

$$\overline{Q}_3 = q_0 \overline{Q}_0 + q_1 \overline{Q}_1 + q_2 \overline{Q}_2 \text{ such that } q_0 + q_1 + q_2 = 1 \qquad (16)$$

in 2D. For affine invariant curves, this relationship will hold for the z coordinate as well.

When three control points considered by equation (16) are co-linear or nearly co-linear in 2D, equation (16) may fail or produce zero weight(s). In these circumstances, linear interpolation may be used to encode a term for a triplet of co-linear control points designated $T_0, T_1, T_2$, which holds under orthographic projection. For each triplet $T_0, T_1, T_2$, a variable t0 may be computed which satisfies:

$$\overline{T}_1 = t_0 \overline{T}_0 + (1 - t_0) \overline{T}_2 \qquad (17)$$

in 2D.

Using these formulations, in some embodiments, the minimal variation term may be expressed in the form:

$$E_{variation} = \sum_Q w_d(d) \|q_0 Q_0 + q_1 Q_1 + q_2 Q_2 - Q_3\|^2 + \qquad (18)$$

$$\sum_T w_d(d) \|t_0 T_0 + (1 - t_0) T_2 - T_1\|^2$$

where the summations range over the set Q of all non-co-linear quadruplets of the type described above and the set T of all co-linear triplets of the type described above; and the variable $w_d(d)$ represents a weight assigned to individual element in each of the equation (18) summations. Such weights may be based on the distances d between the furthest spaced apart 2D control points in the quadruplet or triplet under consideration. In some embodiments, such weights may be based on a Gaussian function of these distances d. In some embodiments, such weights may be based on an equation similar to equation (6) described above.

Method 300 then proceeds to block 306 which comprises determining an minimal foreshortening term which, in some embodiments, may be incorporated into the baseline energy function of block 112. The block 306 minimal foreshortening term may be similar in many respects to (or the same as) the block 212 minimal foreshortening term discussed above. In some embodiments, like the block 212 minimal foreshortening term, the block 306 minimal foreshortening term may comprise a term reflective of a preference for minimal foreshortening in the 3D curves. In one particular embodiment, the block 306 minimal foreshortening term may have the form:

$$E_{foreshortening} = \Sigma_{i,k} w_d(d) \|B_{k+1}^i(z) - B_k^i(z)\|^2 \quad (19)$$

where $B_k^i(z)$ represents the z coordinate of a $k^{th}$ Bézier control point on a Bézier segment i, $B_{k+1}^i(z)$ represents the z coordinate of an adjacent Bézier control point on a Bézier segment i. Where the Bézier splines are cubic, the variable k in equation (19) is permitted to range between k=0-2 for each segment i. The equation (19) summation index i may range over the set of all Bézier segments. In some embodiments, the equation (19) summation index i may range over the set of all Bézier segments on cross-section curves. The weight $w_d(d)$ may be assigned to individual elements of the equation (19) summation. Such weights may be based on the distances d between adjacent 2D control points (e.g. $d = \|\overline{B}_{k+1}^i(x,y) - \overline{B}_k^i(x,y)\|$). In some embodiments, such weights may be based on a Gaussian function of these distances d. In some embodiments, such weights may be based on an equation similar to equation (6) described above.

Method 300 then proceeds to block 308 which comprises determining smooth crossing constraints for the various intersecting curves to be determined in 3D curves 116. As discussed above, method 300 of FIG. 10 is applicable when user input 110 does not specify which of curves are cross-sections. Accordingly, rather than using the cross-section constraints of block 202 and 204 (FIG. 6), block 310 (in some embodiments) may comprise determining only a smooth crossing constraint. Such a smooth crossing constraint may require, at an intersection between any smooth curve c and another smooth curve c', the tangent $t_c$ to the curve c at the intersection to be orthogonal to the tangent $t_{c'}$ to the curve c' at the intersection. This smooth crossing constraint may be expressed as:

$$t_c \cdot t_{c'} = 0 \quad (20a)$$

or, where curves c, c' are represented by Bézier splines and the intersection is at Bézier control points $B_0^i$, $B_0^j$, the tangents at the intersection are the vectors between the Bézier control points $B_0^i$, $B_0^j$ and the neighboring control points on each curve c, c'. This may be expressed as:

$$(B_1^i - B_0^i) \cdot (B_1^j - B_0^j) = 0 \quad (20b)$$

This block 308 smooth crossing constraint may be enforced at all smooth crossings (i.e. intersections between pairs of smooth curves).

In some embodiments, where user input 110 provides additional information about the nature of 2D curves (e.g. whether particular curves are cross-sections, trim curves and/or silhouettes), then block 308 and/or method 300 may comprise determining additional constraints.

Method 300 then proceeds to block 310 which comprises determining an energy function which may be used in the block 114 optimization (FIG. 3). In some embodiments, block 310 may optionally involve determining one or more constraints for the block 114 optimization. The block 310 energy function may be based on any one or more of the terms determined in blocks 302-308. For example, the blocks 310 energy function may comprise one or more of: a projection accuracy term reflective of a preference for re-projection of 3D curves to 2D which preserves the edge shapes of the edges between control points of the original 2D curves (block 302); a projection accuracy term reflective of a preference for re-projection of control points of 3D curves to 2D which preserve the locations of the original 2D control points (block 302); a term reflective of a preference for minimal variation in shape along the 3D curves when compared to the 2D curves (block 304); a term reflective of a preference for minimal foreshortening in the 3D curves (block 306); and/or a term reflective of a preference for curve tangents at smooth crossings to be orthogonal (block 308).

In some embodiments, the block 310 energy function comprises any plurality of these terms. In some embodiments, the block 310 energy function comprises any three or more of these terms. In some embodiments, the block 310 energy function comprises a term reflective of a preference for minimal variation in shape along the 3D curves when compared to the 2D curves (block 304) on its own and/or in combination with any one or more of the other terms. In some embodiments, each of the terms determined to be part of the block 310 energy function may be assigned a corresponding weight. In some embodiments, the weight assigned to the minimal variation term may be greater than the weight assigned to the projection accuracy term which may in turn be greater than the weight assigned to the minimal foreshortening term.

In some embodiments, the block 308 term reflective of a preference for smooth crossing curve tangents to be orthogonal may be determined to be constraints rather than being incorporated into the energy function. For example, block 310 may comprise determining rigid constraints in the form of equation (20a) or (20b). In some embodiments, this block 308 term may be incorporated into the energy function with relatively high weights that make it behave, in the block 114 optimization, in a manner similar to constraint.

In some embodiments, block 310 comprises determining a baseline energy function which is given by:

$$E_{fidelity} = w_a E_{accuracy} + w_v E_{variation} + w_f E_{foreshortening} \quad (21)$$

where:

$E_{accuracy}$, $E_{variation}$, and $E_{foreshortening}$ respectively represent: a projection accuracy term reflective of a preference for re-projection of 3D curves to 2D which preserves the edge shapes of the edges between control points of the original 2D curves (block 302) and reflective of a preference for re-projection of control points of 3D curves to 2D which preserve the locations of the original 2D control points (block 302); a term reflective of a preference for minimal variation in shape along the 3D curves when compared to the 2D curves (block 304); and a term reflective of a preference for minimal foreshortening in the 3D curves (block 306); and $w_a$, $w_v$ and $w_f$ are the weights applied to the individual terms.

In some embodiments, the terms $E_{accuracy}$, $E_{variation}$, and $E_{foreshortening}$ may be respectively provided by equations of the form of equation (15), equation (18) and equation (19). In some embodiments, block 310 comprises determining a smooth crossing constraint in the form of equation (20a) or (20b).

Returning to method 100 (FIG. 3), after the energy function and optional constraints are determined in block 112, method 100 proceeds to block 114 which may comprise performing an optimization (also referred to as running a solver) which minimizes the block 112 energy function or augmented version(s) of the block 112 energy function (as applied using user input 110 and 2D curves 106) to thereby determine 3D curves 116. In some embodiments where 2D curves 106 are represented by piecewise splines (e.g. Bézier splines) having 2D control points, the block 114 optimization may comprise determining 3D control points (e.g. 3D Bézier control points) which characterize 3D curves 116.

Figure 11:
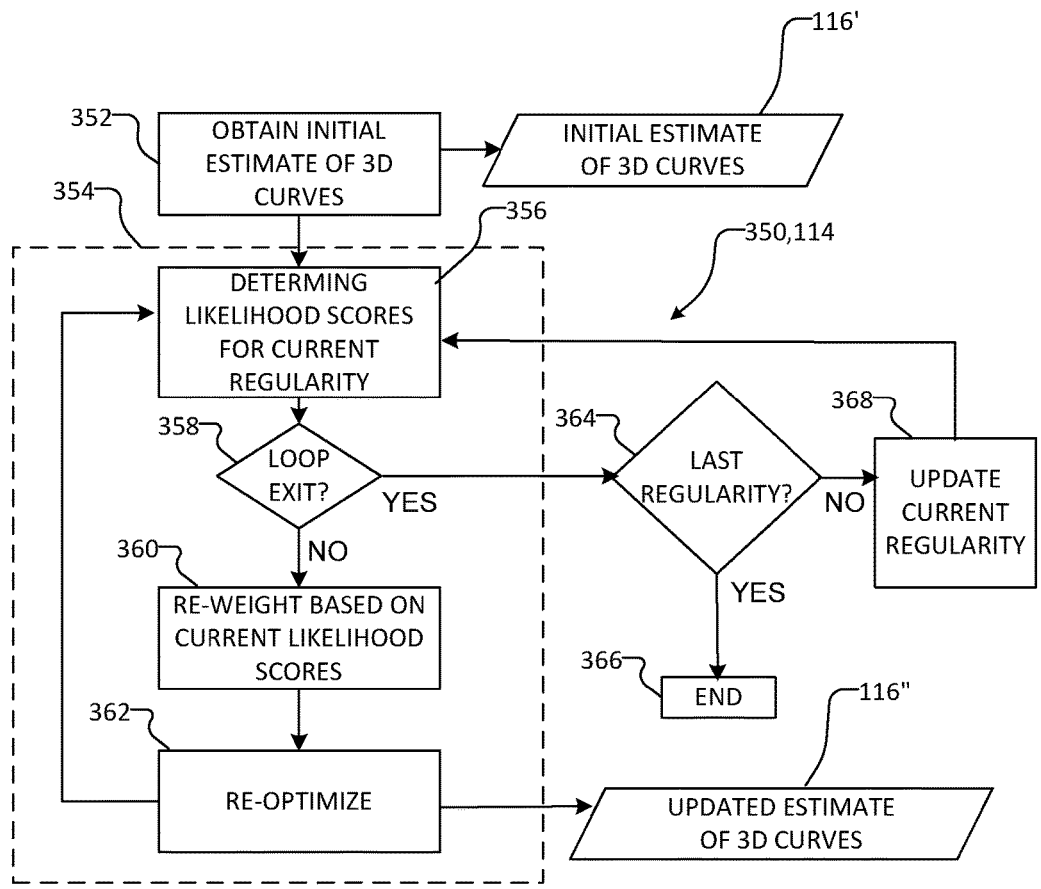
FIG. 11 is a block diagram representation of a method for optimizing an energy function to determine 3D curves which may be used in the method of FIG. 3 according to a particular embodiment.

FIG. 11 is a block diagram representation of a method 350 for optimizing the block 112 energy function (or augmented version(s) of the block 112 energy function) subject to optional block 112 constraints (or augmented version(s) of the block 112 constraints) according to a particular embodiment. In some embodiments, method 350 of FIG. 11 may be used to implement block 114 of method 100 (FIG. 3). Method 350 may be performed by computer 12 (e.g. by processor 14) of system 10 (FIG. 2). Method 300 may be suited for when user input 110 comprises (and/or is limited to): a characterization of each location where 2D curves 106 intersect as an actual intersection (e.g. corresponding to a 3D intersection) or a non-intersection (e.g. a location where two curves belonging to different layers intersect (e.g. because of occlusions or the like)); optionally, an assignment of a layer index to each curve (or each curve segment) (e.g. in cases where 2D curves 106 include disconnected networks); and, optionally, an indication of directionality of surface normals at curve intersections.

Method 350 commences in block 352 which may comprise obtaining an initial estimate of 3D curves 116. Block 352 may comprise performing a baseline (initial) optimization using (e.g. minimizing) the block 112 baseline energy function (or augmented version(s) of the block 112 energy function) subject to optional block 112 constraints (or augmented version(s) of the block 112 constraints) to obtain an initial estimate of 3D curves 116. The block 352 optimization may make use of 2D curves 106 and user input 110 (FIG. 3). In some embodiments where 2D curves 106 are represented by piecewise splines (e.g. Bézier splines) having 2D control points, the block 352 initial estimate of 3D curves 116 may comprise determining initial values for 3D control points (e.g. 3D Bézier control points) which characterize 3D curves 116.

Figure 12:
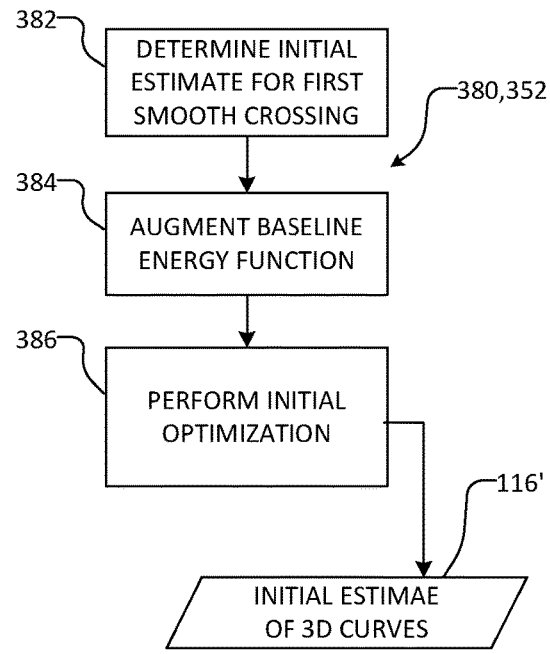
FIG. 12 is a block diagram of a method that may be used to perform an initial optimization to obtain an initial estimate of 3D curves which may be used in the method of FIG. 11 according to a particular embodiment.

FIG. 12 is a block diagram representation of a method 380 for performing an initial optimization to obtain an initial estimate of 3D curves 116 according to a particular embodiment. Method 380 may be performed by computer 12 (e.g. by processor 14) of system 10 (FIG. 2). In some embodiments, method 380 of FIG. 12 may be used to implement block 352 of method 350 (FIG. 11). Method 380 may comprise performing a baseline (initial) optimization using (e.g. minimizing) the block 112 baseline energy function (or augmented version(s) of the block 112 energy function) subject to optional block 112 constraints (or augmented version(s) of the block 112 constraints) to obtain an initial estimate of 3D curves 116'. The method 380 optimization may make use of 2D curves 106 and user input 110 (FIG. 3). In some embodiments where 2D curves 106 are represented by piecewise splines (e.g. Bézier splines) having 2D control points, the method 380 optimization may comprise determining initial values for 3D control points (e.g. 3D Bézier control points) which characterize initial estimate of 3D curves 116'.

Method 380 commences in block 382 which comprises determining an initial estimate of the 3D coordinates of an arbitrary smooth crossing with the network of 2D curves 106. The block 382 estimate may be obtained in some embodiments, by performing an optimization using (e.g. minimizing) the block 112 energy function (or an augmented version of the block 112 energy function subject to the optional block 112 constraints on the four Bézier segments surrounding the smooth crossing. In some embodiments, the block 382 optimization may make use of user input 110 comprising an indication of directionality of a surface normal at the smooth crossing to remove ambiguity with respect to the 3D directionality (e.g. concavity or convexity) of the initial estimate of 3D curves 116'. In some embodiments, the block 384 optimization may remove ambiguity by favoring more convex shapes viewed from above as disclosed by Shao et al.

Figure 13A:
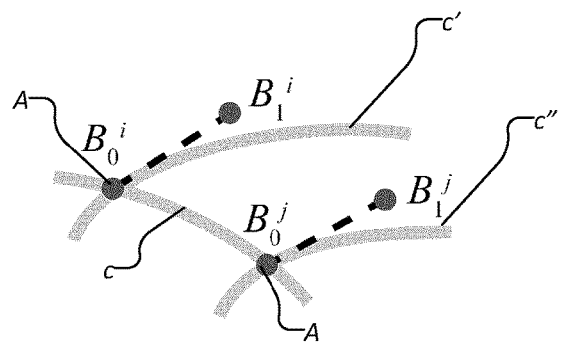
FIGS. 13A and 13B respectively depict exemplary regularity evaluation instances for tangent parallelism and local symmetry.

Method 380 then proceeds to block 384 which comprises augmenting the baseline energy function generated in block 112 to add a tangent parallelism term reflective of a preference for the tangents of adjacent curves intersecting a given curve to be parallel to one another at their intersections. This tangent parallelism characteristic is one of the above-discussed regularity observations and is shown in the example of FIG. 13A. Given a curve c and two other curves c', c" (respectively represented in the FIG. 13A example by Bézier segments $\beta^i$ and $\beta^j$) which form adjacent intersections A, B with the given curve c, we might expect that the tangents $t_{c'}$ and $t_{c''}$ to the curves c' and c" at the intersections A, B to be parallel with one another. Where the shared control points at intersections A, B include $B_0^i$ and $B_0^j$, and the tangents are parallel to one another, then this tangent parallelism may be expressed by the equality:

$$C_{parallelism} = \frac{(B_1^i - B_0^i)}{\|B_1^i - B_0^i\|} - \frac{(B_1^j - B_0^j)}{\|B_1^j - B_0^j\|} = 0 \tag{22}$$

where we have respectively normalized the tangent lengths using their 2D lengths.

In some embodiments, block 384 may comprise adding a tangent parallelism term based on the left hand side of equation (22) to the block 112 energy function. In some embodiments, the block 384 tangent parallelism term may have the form:

$$E_{parallelism} = \sum_{\{ai\}} w_d(\alpha) \left\| \frac{(B_1^i - B_0^i)}{\|B_1^i - B_0^i\|} - \frac{(B_1^j - B_0^j)}{\|B_1^j - B_0^j\|} \right\|^2 \tag{23}$$

where $\{ai\}$ is the set of pairs of adjacent intersections on all curves and $w_d(\alpha)$ is weight for each pair of adjacent intersections explained in more detail below. It will be appreciated that at some intersections the shared control points may be $B_3^i$ or $B_3^j$. For such intersections, equation (23) may be suitably modified to form the tangents with the control points $B_3^i$, $B_3^j$ and their adjacent control points $B_2^i$ and/or $B_2^j$ as the case may be. In some embodiments, the block 382 tangent parallelism term added to the block 112 (or block 310) energy function may have the form:

$$w_p E_{parallelism} \tag{24}$$

where $w_p$ is a weight that may be used to control the strength of the tangent parallelism term relative to the other terms in the energy function. In some embodiments, the expression (24) is added to the energy function expressed in equation (21) to provide an augmented energy function of the form:

$$E = w_a E_{accuracy} + w_v E_{variation} + w_f E_{foreshortening} + w_p E_{parallelism} \tag{25}$$

As discussed above in connection with equation (23), each pair of adjacent intersections in the set of adjacent intersection pairs $\{ai\}$ may be assigned a weight $w_d(\alpha)$. Augmenting the energy function in block 384 may involve determining and applying a weight for each pair of adjacent intersections. For each pair of adjacent intersections, this weight $w_d(\alpha)$ may be based on the angle $\alpha$ between the tangents at the adjacent intersections in 2D curves 106. Referring back to FIG. 13A, the 2D tangents for this exemplary pair of intersections are given by $\overline{B}_1^i - \overline{B}_0^i$ and $\overline{B}_1^j - \overline{B}_0^j$ and it will be appreciated that the angle $\alpha_{i,j}$ between these two vectors can be determined (e.g. from their dot product or otherwise). In some embodiments, the weights $w_d(\alpha)$ for each pair of adjacent intersections may be based on a Gaussian function of the angle $\alpha$ between the tangents at the adjacent intersections in 2D curves 106. In some embodiments, the weights $w_d(\alpha)$ for each pair of adjacent intersections may have the form $w_d(\alpha) = Ae^{-(\alpha/2\sigma)^2}$ where A and $\sigma$ are configurable constants and $\alpha$ is the angle between the tangents at the adjacent intersections in 2D curves 106. In some embodiments, A is set to 0.1 and $\sigma$ is set to 15°.

After augmenting the energy function in block 384, method 380 proceeds to block 386 which comprises propagating 3D coordinates of the block 382 initial smooth crossing to the remaining curves. This block 386 procedure may comprise performing an optimization using (e.g. minimizing) the block 112 energy function, as augmented by the addition of the weighted tangent parallelism term in block 384 (e.g. equation (25)), subject to the optional block 112 constraints over the network of 2D curves 106 to obtain initial estimate of 3D curves 116'. Since few regularities are accounted for at this stage, the block 386 optimization may comprise assigning a relatively high weight $w_a$ to the projection accuracy term, a relatively moderate weight $w_p$ to the tangent parallelism term, a relatively low weight $w_v$ to the minimal variation term and a still lower weight $w_f$ to the foreshortening term (see equation (25), for example). The result of the block 386 optimization is an initial estimate of 3D curves 116'.

The initial estimate of 3D curves generated in block 386 provide the block 352 initial estimate of 3D curves 116' (see method 350 of FIG. 11). As discussed above, where 2D curves 106 are represented by piecewise splines (e.g. Bézier splines) having 2D control points, the block 352 initial estimate of 3D curves 116' may comprise determining initial values for 3D control points (e.g. 3D Bézier control points) which characterize the initial estimate of 3D curves 116'. It will be appreciated that method 380 (FIG. 12) represents one particular and non-limiting technique for obtaining an initial estimate of 3D curves 116' in block 352 of method 350. In other embodiments, other techniques could be used for generating the block 352 initial estimate of 3D curves 116'. By way of non-limiting example, method 240 (FIG. 9) or any other suitable technique could be used in block 352 to obtain an initial estimate of 3D curves 116'.

After obtaining the block 352 initial estimate of 3D curves 116, method 350 (FIG. 11) proceeds to a loop 354. Loop 354 may be performed once for each of a series of one or more regularity observations (which may be referred to herein as regularities or regularizers). As discussed above, regularities that are commonly observable in concept drawings include: parallelism, orthogonality, symmetry, curve planarity and curve linearity. Loop 354 may be performed for each (or any subset of these regularities). Loop 354 may consider each regularity in turn and may use an intermediate set of 3D curves to determine circumstances in which each regularity is applicable. For each iteration of loop 354, instances where a regularity is determined to be applicable may be set to be hard constraints for subsequent optimization, instances where a regularity is determined to be inapplicable can be discarded and instances where the applicability of a regularity is undecided may comprise incorporating these instances of the regularity as soft constraints (e.g. by augmenting the energy function to include terms based on these instances of the regularity). In some embodiments, the regularities evaluated in loop 354 may be evaluated in an order which involves parallelism, then orthogonality, then local symmetry, then curve-level regularities (e.g. curve planarity and/or curve linearity) and then inter-curve regularities. It should be noted that merely because regularities are addressed in this order in some embodiments, this order does not imply that all of these regularities are evaluated in method 350.

Method 350 proceeds to block 356 which comprises using an intermediate set of 3D curves (e.g. 3D Bézier control points) to determine a likelihood score or likelihood metric for each instance where the current regularity may be evaluated within the intermediate set of 3D curves. In the first iteration of loop 354, the intermediate set of 3D curves comprises the initial estimate of 3D curves 116' generated in block 352. In subsequent iterations of loop 354, the intermediate set of 3D curves may comprise the curves generated in block 362 as explained in more detail below. As will be explained in more detail below, for each instance where the current regularity may be evaluated within the intermediate set of 3D curves (which may be referred to as regularity evaluation instances), the block 356 likelihood score comprises a metric which may be used as a basis for determining whether, at that regularity evaluation instance, the current regularity should be enforced as a hard constraint, enforced as a soft constraint or discarded for subsequent optimization.

It is assumed, for the purposes of explanation that the first regularity evaluated in loop 354 is parallelism (i.e. tangent parallelism at pairs of adjacent intersections as discussed above in connection with FIG. 13A and equation (22)). In the case where the current regularity is tangent parallelism, the regularity evaluation instances comprise adjacent pairs of intersections. In some embodiments, the regularity being evaluated can be expressed in terms of an angle which may be evaluated (using the intermediate set of 3D curves) at each regularity evaluation instance. For example, in the case of tangent parallelism (referring to FIG. 13A), the angle $\alpha_{i,j}$ between two adjacent tangents $B_1^i - B_0^i$ and $B_1^j - B_0^j$ can be determined (e.g. from their dot product or otherwise). Block 356 may comprise evaluating the current regularity at each regularity evaluation instance and assigning a likelihood score $L(\alpha)$ based on this angle $\alpha$ according to a rule of the form:

$$L(\alpha) = \begin{cases} 1 & \text{if } \alpha < I_b \\ 0 & \text{if } \alpha > O_b \\ \min(1, a\alpha^b) & \text{if } I_b \le \alpha \le O_b \end{cases} \quad (26)$$

For each regularity evaluation instance, equation (26) expression assigns a likelihood score of 1 (i.e. the regularity is applicable) if the angle $\alpha$ is within some inner bound $I_b$, a likelihood score of 0 (i.e. the regularity is inapplicable) if the angle $\alpha$ is greater than some outer bound $O_b$ and a likelihood between 0 and 1 where the $\alpha$ is within is between $I_b$ and $O_b$. In particular embodiments, $O_b$ is set to 15° and $I_b$ is set to 5°, but this is not necessary. The equation (26) function min $(1,aa^b)$ for circumstances where $\alpha$ is within is between $I_b$ and $O_b$ represents a monomial likelihood function that increases from near zero at $O_b$ to near 1 at $I_b$. In some embodiments, the constants a, b can be selected such that $L(I_b)=1$ and $L(O_b)=0.005$. In some embodiments, rules of forms different from equation (26) may be used to evaluate regularities. Such rules may depend on criteria other than angles, for example. Such rules may comprise other functions for instances between the applicable and inapplicable thresholds.

After determining likelihood scores in block 356, method 350 proceeds to block 358 which comprises a loop exit evaluation. In the first iteration, it is unlikely that the block 358 loop exit criteria will be met and method 350 proceeds to block 360. Block 360 comprises re-weighting the energy function and optionally augmenting the constraints based on the likelihood scores determining in block 356. The block 360 re-weighting may comprise: considering each regularity evaluation instance; and
- if the likelihood score $L(\alpha)=1$ for that instance, classifying the regularity as applicable and making the regularity a hard constraint for that instance (e.g. for the remainder of method 350);
- if the likelihood score $L(\alpha)=0$ for that instance, classifying the regularity as inapplicable for that instance and removing that instance from further consideration for the current regularity (e.g. for the remainder of method 350); and
- otherwise concluding that the applicability of the regularity is undetermined at that instance and making the instance a soft constraint which may depend on the likelihood score $L(\alpha)$ (e.g. by augmenting the energy function to add a term relating to the regularity at that instance which may be weighted by the likelihood score $L(\alpha)$).

It will be appreciated that where the rules used for obtaining the block 356 likelihood scores are different from that of equation (26), other suitable criteria may be used to classify each regularity evaluation instance as applicable (hard constraint), inapplicable (discard) or having undetermined applicability (soft constraint).

Where block 356 concludes that a regularity is applicable at a particular regularity evaluation instance, then that regularity may be added as a hard constraint for the remainder of method 350. Where block 356 concludes (based on a likelihood score) that the applicability of a regularity at a particular regularity evaluation instance is undetermined, the regularity evaluation instance may be formulated as a soft constraint which may be used to augment the energy function in block 360. In particular embodiments, the energy function may be augmented in block 360 by adding a term relating to the regularity at the regularity evaluation instance and the added term may be weighted by the likelihood score at that regularity evaluation instance. This may referred to as re-weighting the energy function. For example, in particular embodiments, the energy function may be re-weighted in block 360 according to:

$$E_{augmented} = E_{fidelity} + w_k E^*_k \quad (27)$$

where k is the current regularity, $w_k$ is the weight assigned to the current regularity and $E_{fidelity}$ may have the form of equation (25), for example.

The equation (27) term $E^*_k$ is an energy associated the current regularity k evaluated over the set of regularity evaluation instances which are concluded (in block 356) to have undetermined applicability and weighted based on the likelihood score at each regularity evaluation instance. For example, the current regularity is tangent parallelism (i.e. k=parallelism), the term $E^*_{parallelism}$ may be provided by a modified version of equation (23) having the form:

$$E^*_{parallelism} = \sum_{\{m\}} L(\alpha_m) \left\| \frac{(B_1^i - B_0^i)}{\|B_1^i - B_0^i\|} - \frac{(B_1^j - B_0^j)}{\|B_1^j - B_0^j\|} \right\|^2 \quad (28)$$

where m is the set of regularity evaluation instances which are concluded (in block 356) to have undetermined applicability and $L(\alpha_m)$ is the likelihood score at any particular regularity evaluation instance. It will be appreciated that equation (28) is similar to equation (23), except that the equation (28) summation runs only over the set m of regularity evaluation instances which are concluded (in block 356) to have undetermined applicability (rather than the entire set fail of adjacent intersections in equation (23)) and that the equation (28) weights $L(\alpha_m)$ are likelihood scores (rather than general functions $w_d(\alpha)$). As was the case with equation (23), it will be appreciated that at some intersections the shared control points may be $B_3^i$ or $B_3^j$. For such intersections, equation (28) may be suitably modified to form the tangents with the control points $B_3^i$, $B_3^j$ and their adjacent control points $B_2^i$ and/or $B_2^j$ as the case may be.

Once any new hard constraints are added to the set of hard constraints and the energy function is re-weighted (e.g. according to equation (27)), method 350 proceeds to block 362 which comprises performing an optimization based on any new constraints (determined in block 356 and/or block 360) and using (e.g. minimizing) the re-weighted energy function determined in block 360 to arrive at an updated estimate of 3D curves 116". The updated estimate of 3D curves 116" may comprise 3D coordinates of corresponding 3D control points. In some embodiments, the block 362 optimization is performed with a weight $w_k$ for the current regularity which is significantly higher than any other weights in the equation (21) expression for $E_{fidelity}$. For example, in some embodiments, the current regularity weight $w_k$ may be 5 or even 10 times the other weights in the equation (21) expression for $E_{fidelity}$.

Method 350 then loops back to block 356 for another iteration, where the block 362 updated estimate of 3D curves 116" may be used as the intermediate set of 3D curves for further processing. The loop 354 comprising blocks 356, 358, 360 and 362 may iterate in this manner until a loop exit criteria is met in block 358. In general, block 358 may comprise any suitable loop exit criteria. For example, block 358 may conclude that loop 354 should be concluded: after a suitable number (e.g. 4 or 5) iterations, after a suitable amount of time has elapsed, after all (or a threshold number or threshold percentage of regularity evaluation instances have been determined to be applicable or inapplicable), when the changes between successive iterations are less than a suitable threshold and/or the like. When method 350 exits loop 354, it proceeds to block 364 which involves an inquiry into whether the current regularity is the last regularity. At the first instance reaching block 364, the block 364 inquiry is likely to be negative in which case method 350 proceeds to block 368.

Block 368 comprises updating the current regularity to be a new regularity and then returning to loop 354 with the new current regularity. Block 368 may also comprise refreshing the energy function to its original (e.g. block 112 (FIG. 3) format). Hard constraints, however, may be maintained, since these reflect instances where the previous regularity was determined to be applicable. Method 350 then returns to loop 354, where the procedures of loop 354 are repeated for the new current regularity. Method 350 will eventually reach the block 364 inquiry when there are no further regularities to evaluate. In this instance, the block 364 inquiry will be positive and method 350 ends in block 366. Block 366 may set the updated estimate of 3D curves 116″ determined in the last iteration of block 362 to be the final 3D curves 116 generated by block 114 (see FIG. 3).

As discussed above, in some embodiments, the order of regularities evaluated in loop 354 of method 350 may comprise parallelism, then orthogonality, then local symmetry, then curve-level regularities (e.g. curve planarity and/or curve linearity) and then inter-curve regularities. The parallelism regularity was discussed above. These other regularities and their evaluation are now described in more detail.

Evaluating the orthogonality regularity may involve evaluating whether intersecting curves have orthogonal tangents at the intersection point. As discussed above, the orthogonality regularity may already be imposed as a rigid constraint for smooth crossings, but may be applied to intersecting curves more generally in method 350. Intersections other than smooth crossings may have orthogonal tangents or may be indicative of other geometric features, such as, by way of non-limiting example, sharp edges, silhouettes and/or the like. Equation (20b) describes the tangent orthogonality condition at an intersection between curves c, c' represented by Bézier splines where the intersection is at Bézier control points $B_0^i$, $B_0^j$. Equation (20b) may be used to determine an expression for $E^*_{orthogonality}$ which may be used to re-weight the energy function in block 360 and in the block 362 optimization (e.g. by plugging $E^*_{orthogonality}$ into equation (27) for $E^*_k$) and which may be provided by an equation having the form:

$$E^*_{orthogonality} = \Sigma_{\{m\}} L(\alpha_m) \|(B_1^i - B_0^i) \cdot (B_1^j - B_0^j)\|^2 \quad (28)$$

where m is the set of regularity evaluation instances (intersections in the case of the orthogonality regularity) which are concluded in block 356 to have undetermined applicability, $L(\alpha_m)$ is the likelihood score at any particular regularity evaluation instance determined in block 356 and $\alpha_m$ is the angle between the tangent vectors $(B_1^i - B_0^i)$ and $(B_1^j - B_0^j)$ at any particular regularity evaluation instance (which may be determined using the dot product between these vectors (or by any other suitable means)).

After orthogonality, the next regularity is local symmetry. If a curve c defines a local symmetry plane C, then any curve c' which is orthogonal to the curve c (i.e. at an intersection of c and c') is symmetric about the plane C and is also orthogonal to the plane C. A vector is generally orthogonal to a plane C if it is orthogonal to two independent vectors in the plane C. As discussed above, in some embodiments, the orthogonality regularity is evaluated prior to the symmetry regularity. In such embodiments, the regularity evaluation instances (for local symmetry) can be limited to intersections where it is already known that the tangents are orthogonal (i.e. the symmetry of $\beta^i$ need only be evaluated at intersections with $\beta^j$ if it is already known that the tangent to $\beta^j$ is orthogonal to the tangent to $\beta^i$ at the intersection) and evaluation of local symmetry may be limited to consideration of one additional vector which is not co-linear with the tangent to $\beta^i$ at the intersection. A suitable exemplary evaluation is shown in FIG. 13B.

Figure 13B:
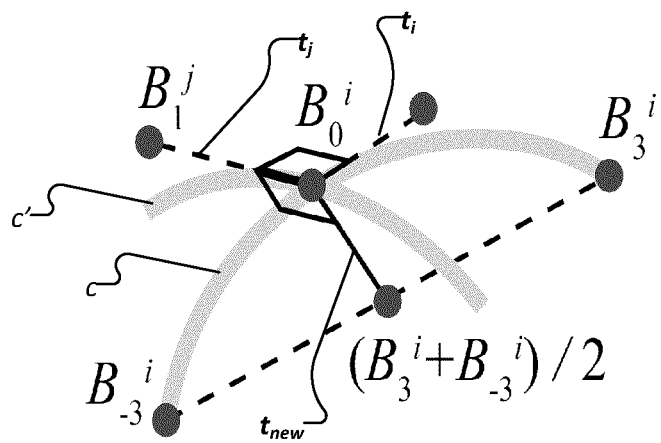

FIG. 13B shows the evaluation of an intersection on a curve c as being potentially a curve which defines a local symmetry plane in a region of the intersection. The evaluation is being performed at a regularity evaluation instance where the curve c intersects the curve c' and where it is known a priori that the tangent $t_i$ to curve c and the tangent $t_j$ to curve c' at the intersection are orthogonal. The search is for another vector in the plane defined by curve c which is orthogonal to $t_j$, but which is not co-linear with $t_i$. In the embodiment illustrated by FIG. 13B, the vector selected is $t_{new}$ which may be expressed in terms of control points as $$t_{new} = \frac{B_3^i + B_{-3}^i}{2} - B_0^i$$

where $B_3^i$ is used to express a control point that is a suitable number (e.g. three) control points removed from $B_0^i$ along curve c in a first direction and $B_{-3}^i$ is used to express a control point that is a suitable number (e.g. three) control points removed from $B_0^i$ along curve c in a second (opposite) direction. When $\|t_{new}\| \approx 0$ (e.g. less than some suitable threshold), then the curve c forms a generally straight line at the intersection under consideration and does not define a unique plane. In these circumstances (i.e. where $\|t_{new}\| \approx 0$), symmetry is not evaluated at this intersection. The vector $t_{new}$ will be orthogonal to $t_j$ when:

$$t_{new} \cdot t_j = \left(\frac{B_3^i + B_{-3}^i}{2} - B_0^i\right) \cdot (B_1^j - B_0^j) = 0 \quad (29)$$

which leads to an expression for $E^*_{symmetry}$ which may be used to re-weight the energy function in block 360 and in the block 362 optimization (e.g. by plugging $E^*_{symmetry}$ into equation (27) for $E^*_k$) and which may be provided by an equation having the form:

$$E^*_{symmetry} = \sum_{\{m\}} L(\alpha_m) \left\|\left(\frac{B_3^i + B_{-3}^i}{2} - B_0^i\right) \cdot (B_1^j - B_0^j)\right\|^2 \quad (30)$$

where m is the set of regularity evaluation instances (intersections determined a priori to have orthogonal tangents) which are concluded in block 356 to have undetermined applicability, $L(\alpha_m)$ is the likelihood score at any particular regularity evaluation instance determined in block 356 and $\alpha_m$ is the angle between the vectors $$t_{new} = \frac{B_3^i + B_{-3}^i}{2} - B_0^i$$

and $t_j=(B_1^j-B_0^j)$ at any particular regularity evaluation instance (which may be determined using the dot product between these vectors (or by any other suitable means)).

After local symmetry, the next regularities for evaluation are curve-level regularities. A first curve level regularity which may be evaluated is curve planarity—i.e. whether a curve c is located on a corresponding plane C having a plane normal $n_c$. A curve c may be considered to be planar (on a corresponding plane C) where its tangent is everywhere orthogonal to the plane normal $n_c$ which may be expressed (in terms of control points) in the form:

$$(B_k^i-B_l^j)\cdot n_c=0 \text{ for all } (i,k)\neq(j,l) \text{ on curve } c \tag{31}$$

Based on this equation, an equation which represents the planarity of the entire curve c may be expressed in the form:

$$C_{planar}=\Sigma_{(i,k)\neq(j,l)}\|(B_k^i-B_l^j)\cdot n_c\|^2 \tag{32}$$

Figure 14A:
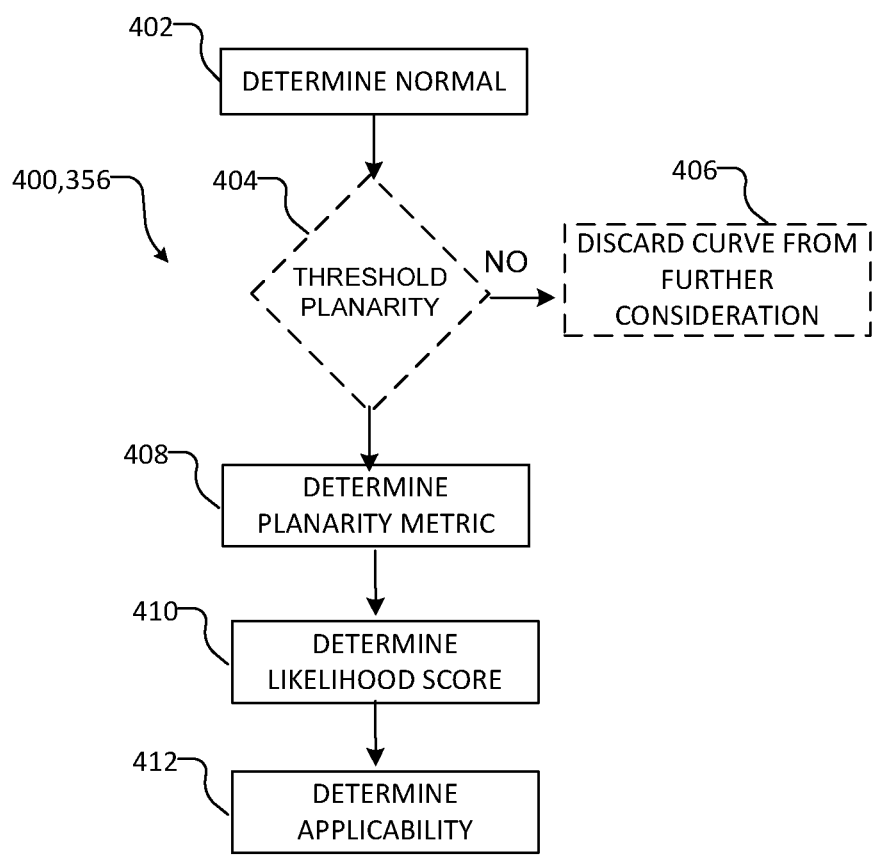
FIGS. 14A and 14B respectively depict block diagram representations of methods for determining likelihood scores for curve-level planarity and curve-level linearity which may be used in the method of FIG. 11 according to particular embodiments.

FIG. 14A is a block diagram representation of a method 400 for determining likelihood scores (or likelihood metrics) for curve-level planarity according to a particular embodiment. In some embodiments, method 400 of FIG. 14A may be used to implement block 356 of method 350 (FIG. 11). In some embodiments, method 400 may be used once for each regularity evaluation instance (e.g. once for each curve for which the curve planarity has undetermined applicability). Method 400 may be performed by computer 12 (e.g. by processor 14) of system 10 (FIG. 2).

Method 400 commences in block 402 which comprises determining a potential normal $n_c$ for the curve c under consideration. This block 402 procedure may comprise performing a least squares fit (or some other suitable curve-fitting technique) which minimizes equation (32) to solve for $n_c$. Method 400 then proceeds to block 404 which optionally performs a thresholding process to get rid of clearly non-planar curves. The block 404 process may comprise evaluating equation (32) for the curve under consideration and comparing the result to a suitable threshold. If the result is greater than the threshold (block 404 NO branch), then method proceeds to block 406 where it is concluded that the curve is clearly not planar and the curve is discarded from further consideration. If on the other hand, the block 404 result is less than the threshold (indicating that the planarity of the curve merits further consideration), then method 400 proceeds to block 408 which comprises determining a planarity metric which expresses how close the curve under consideration is to planar. In some embodiments, this planarity metric may be expressed as an angle α. In one particular embodiment, this angle α may be given by an equation of the form:

$$\alpha = \frac{\sum_{(i,k)\neq(j,l)} w_n \cdot \text{angle}(B_k^i-B_l^j, n_c)}{\sum_{(i,k)\neq(j,l)} w_n} \tag{33}$$

where angle(•,•) is an operator that returns the angle between its arguments and $$w_n=(90°-\text{angle}(B_k^i-B_l^j,n_c))^2 \tag{34}$$

Based on the block 408 planarity metric, method 400 determines a likelihood score in block 410. For example, in some embodiments, the likelihood score of a curve c under consideration being planar may be given by L(α) in equation (26). Method 400 then proceeds to block 412 which comprises determining the applicability of the curve-level planarity regularity. In some embodiments, the block 412 applicability determination may be made according to equation (26) and the procedure discussed above.

Returning to FIG. 11, the curve-level planarity likelihood scores determined for each curve in method 400 may be treated the same way as the likelihood scores described above. For example, the method 400 planarity likelihood scores can be used to re-weight the energy function in block 360 and for optimization in block 362. In some embodiments, the curve-level planarity likelihood scores can be used to re-weight the energy function in block 360 and for optimization in block 362 according to equation (27) described above, where $E^*_k$ is set to $E^*_{planar}$ and $E^*_{planar}$ is given by:

$$E^*_{planar}=\Sigma_{\{m\}}L(\alpha_m)C_{planar\_m} \tag{35}$$

where m is the set of regularity evaluation instances (potentially planar curves) which are concluded (e.g. in block 412) to have undetermined applicability, $L(\alpha_m)$ is the planarity likelihood score determined (e.g. in block 410) for any potentially planar curve and $\alpha_m$ is the planarity metric for a potentially planar curve (which may be determined (e.g. in block 408) using equation (33)).

In some embodiments, if a curve might be considered to be planar (e.g. the curve passes the block 404 planarity thresholding process), then it may also be desirable to evaluate whether the plane of a given planar curve is parallel or orthogonal to the planes of other planar curves. In some embodiments, this evaluation may be accomplished by adding procedures to each iteration of loop 354 (FIG. 11). In some embodiments, this evaluation may be accomplished with some modification of method 400 (FIG. 14A). For example, this modification of method 400 (FIG. 14A) may be accomplished by performing blocks 402, 404 and 406 (if applicable) for all curves. Once the block 402 normal vectors are known for all potentially planar curves, a clustering process may be performed to cluster potentially planar curves with normals which have approximately the same directions (e.g. normal directions within a suitable threshold of one another). Potentially planar curves in each cluster may be considered to have potentially parallel planes. A common normal $n_{cl}$ may be then determined for each cluster and may be assigned to all of the curves in each cluster. The assigned normal $n_{cl}$ for a cluster may be determined using any of a number of suitable averaging techniques (e.g. averaging the normals over the potentially planar curves in the cluster). In one particular embodiment, the normal $n_{cl}$ for a cluster may be chosen to be the vector $n_c$ which minimizes equation (32) over all of the curves in the cluster. The cluster normals $n_{cl}$ determined in this manner may be used for their corresponding curves (instead of the block 402 normals) to perform the remaining procedures of method 400. For example, the cluster normals $n_{cl}$ may be used for each corresponding curve to determine a planarity metric (e.g. α) for the curve in block 408, to determining a likelihood score (e.g. L(α)) for the curve in block 410) and to determine applicability for the curve in block 412. In some embodiments, where clustering results in a conclusion (e.g. in block 412) that planarity is inapplicable for a curve in the cluster, the cluster may be separated into smaller sub-clusters (e.g. by selecting a smaller clustering threshold) and the process may be repeated using the smaller sub-clusters.

In some embodiments, it may also be desirable to evaluate whether the planes of any potentially planar curves may be orthogonal to the planes of other potentially planar planes. In some embodiments, orthogonality evaluation may be performed after clustering of curves and determining the cluster normals $n_{cl}$, but prior to using the cluster normals $n_{cl}$ to perform the other procedures of method 400. The cluster normals $n_{cl}$ for each pair of clusters may be considered and if these normals are approximately orthogonal (i.e. directions within a suitable threshold of being orthogonal to one another), then a pair of new orthogonal normals $n_{cl\_orth1}$, $n_{cl\_orth2}$ may be determined and assigned to the respective clusters. In some embodiments, these orthogonal normals $n_{cl\_orth1}$, $n_{cl\_orth2}$ may be determined by minimizing equation (32) for each of the pair of clusters (e.g. over all of the curves of each cluster) subject to the constraint that the new normals $n_{cl\_orth1}$, $n_{cl\_orth2}$ are required to be orthogonal. The orthogonal normals $n_{cl\_orth1}$, $n_{cl\_orth2}$ determined in this manner may then be used for their corresponding curves (instead of the block 402 normals or the original cluster normals $n_{cl}$) to perform the remaining procedures of method 400. For example, the orthogonal normals $n_{cl\_orth1}$, $n_{cl\_orth2}$ may be used for their corresponding curves to determine the planarity metrics (e.g. $\alpha$) for their corresponding curves in block 408, to determining the likelihood scores (e.g. $L(\alpha)$) for their corresponding curves in block 410) and to determine applicability for their corresponding curves in block 412.

Another curve level regularity which may be evaluated is curve linearity—i.e. whether a curve c is straight. In some embodiments, an expression that represents a metric of the linearity of a curve c may be provided by the equation:

$$C_{linear} \Sigma_{(i,k)} \| B_0^0 t_{i,k} + B_3^n (1-t_{i,k}) - B_k^i \|^2 \qquad (36)$$

where $B_0^0$ represents the first control point on the curve, $B_3^n$ represents the last control point on a curve and $B_k^i$ represents an intermediate control point on the curve, and $t_{i,k}$ are determined by minimizing equation (36) using the control points associated with 2D curves 106.

Figure 14B:
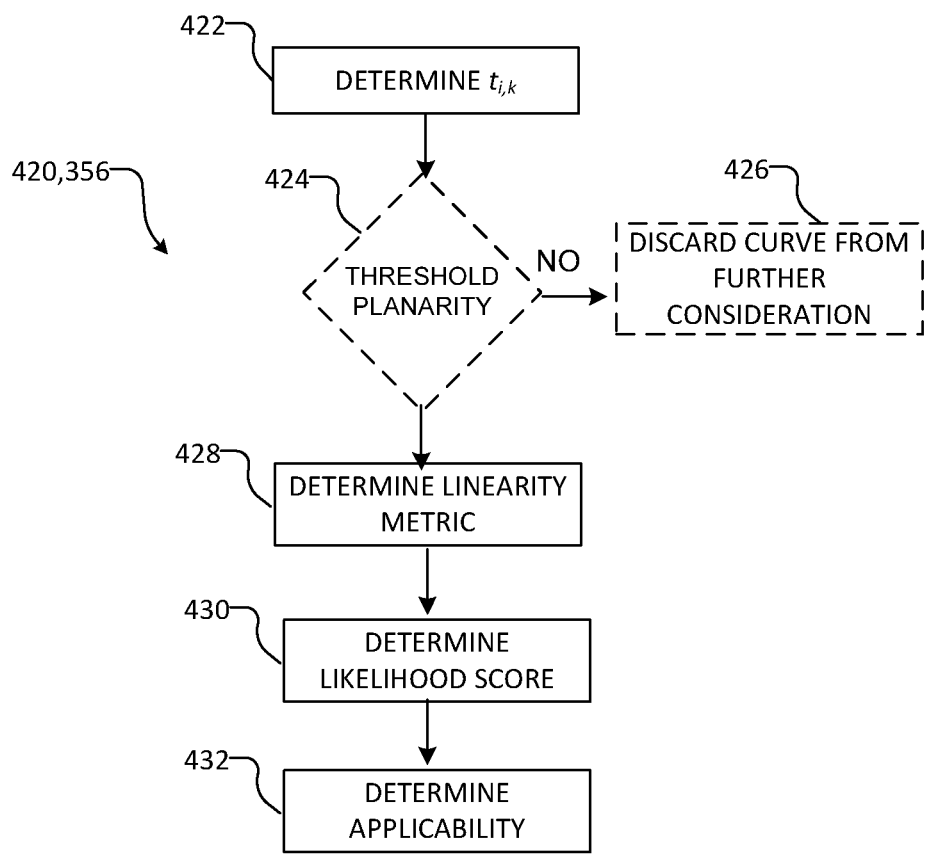

FIG. 14B is a block diagram representation of a method 420 for determining likelihood scores (or likelihood metrics) for curve linearity according to a particular embodiment. In some embodiments, method 420 of FIG. 14B may be used to implement block 356 of method 350 (FIG. 11). In some embodiments, method 420 may be used once for each regularity evaluation instance (e.g. once for each curve for which the curve linearity has undetermined applicability). Method 420 may be performed by computer 12 (e.g. by processor 14) of system 10 (FIG. 2).

Method 420 commences in block 422 which comprises determining the parameters $t_{i,k}$ for the curve c under consideration. As discussed above, this block 422 procedure may comprise performing a least squares fit (or some other suitable curve-fitting technique) which minimizes equation (36) over 2D curves 106 to solve for the parameters $t_{i,k}$. Method 420 then proceeds to block 424 which optionally performs a thresholding process to get rid of clearly non-linear curves. The block 424 process may comprise evaluating equation (36) for the curve under consideration and comparing the result to a suitable threshold. If the result is greater than the threshold (block 424 NO branch), then method proceeds to block 426 where it is concluded that the curve is clearly not linear and the curve is discarded from further consideration. If on the other hand, the block 424 result is less than the threshold (indicating that the linearity of the curve merits further consideration), then method 420 proceeds to block 428 which comprises determining a linearity metric which expresses how close the curve under consideration is to linear. In some embodiments, this linearity metric may be expressed as an angle $\alpha$. In particular embodiments, this angle $\alpha$ may be expressed by an equation which is based on angles between pairs of lines connecting control points (e.g.

$$\sum_{\substack{(i,k) \neq (j,l) \\ (m,n) \neq (o,p)}} \text{angle}(B_k^i - B_l^j, B_m^n - B_o^p)$$

where the summation runs over the control points on the curve c in consideration) and which may be suitably normalized. In other embodiments, the linearity metric need not be expressed as an angle.

Based on the block 428 linearity metric, method 420 determines a likelihood score in block 430. For example, in some embodiments, the likelihood score of a curve c under consideration being linear may be given by $L(\alpha)$ in equation (26) where $\alpha$ is the block 428 linearity metric. Method 420 then proceeds to block 432 which comprises determining the applicability of the curve-level linearity regularity. In some embodiments, the block 432 applicability determination may be made according to equation (26) and the procedure discussed above.

Returning to FIG. 11, the curve-level linearity likelihood scores determined for each curve in method 420 may be treated the same way as the likelihood scores described above. For example, the method 420 linearity likelihood scores can be used to re-weight the energy function in block 360 and for optimization in block 362. In some embodiments, the curve-level linearity likelihood scores can be used to re-weight the energy function in block 360 and for optimization in block 362 according to equation (27) described above, where $E^*_k$ is set to $E^*_{linear}$ and $E^*_{linear}$ is given by:

$$E^*_{linear} = \Sigma\{m\} L(\alpha_m) C_{linear\_m} \qquad (37)$$

where m is the set of regularity evaluation instances (potentially linear curves) which are concluded (e.g. in block 432) to have undetermined applicability, $L(\alpha_m)$ is the linearity likelihood score determined (e.g. in block 430) for any potentially linear curve and $\alpha_m$ is the linearity metric for a potentially linear curve (which may be determined (e.g. in block 428)).

Certain implementations of the invention comprise computer processors which execute software instructions which cause the processors to perform a method of the invention. For example, one or more processors in a sensing system or a monitoring system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments are discussed herein, those of skill in the art will recognize certain modifications, permutations, additions and sub-combinations thereof. For example:

In some of the embodiments described above, regularity metrics are determined on the basis of angles α and likelihood scores L(α). Using the angles α represents one convenient technique to assess these regularities. However, the use of angles is not necessary. In some embodiments, other metrics could be used to assess the regularity. By way of non-limiting example, in the case of tangent parallelism, evaluating equation (22) at a pair of adjacent intersections may provide a suitable indication of whether the pair of adjacent intersections has parallel tangents and a likelihood score could be formulated on the basis of this metric in addition to or as an alternative to the angle α. As another non-limiting example, evaluating equation (32) over a curve may provide a suitable indication of whether the curve is planar and a likelihood score could be formulated on the basis of this metric in addition to or as an alternative to the angle α.

In some embodiments, regularities evaluated earlier than other regularities may be re-evaluated after all of the regularities being considered have been evaluated once. For example, method 350 (FIG. 11) described above, involves evaluating tangent parallelism as a first regularity. In some embodiments, tangent parallelism (or any other regularity evaluated relatively early in the sequence of regularities) may be re-evaluated after evaluating the other regularities (in particular after evaluating curve-level regularities). This re-evaluation may be done, for example, by removing the constraints related to tangent parallelism (which may have been adopted in the first iteration of tangent parallelism evaluation) and re-evaluating tangent parallelism. This re-evaluation may also be done by maintaining tangent parallelism evaluation instances determined to be applicable as soft constraints (e.g. in the energy function, but with high weight), rather than making these applicable tangent parallelism evaluation instances into hard constraints. Then, upon re-evaluation, the weights applied to the applicable tangent parallelism evaluation instances may be reduced or set to zero to permit an open re-evaluation of tangent parallelism. Such re-evaluation is not limited to tangent parallelism and may be performed for other regularities.

While a number of exemplary aspects and embodiments have been discussed above, those of skill in the art will recognize certain modifications, permutations, additions and sub-combinations thereof. It is therefore intended that aspects of the invention should be interpreted to include all such modifications, permutations, additions and sub-combinations as are within their true spirit and scope.

What is claimed is:

1. A computer-implemented method for estimating a three-dimensional (3D) representation of a set of two-dimensional (2D) curves of a concept drawing, the estimate of the 3D representation corresponding to a 3D object underlying the concept drawing, the method comprising:

obtaining, at a computer system, a representation of a set of 2D curves of a concept drawing that represent a 3D object underlying the concept drawing;

determining at least one actual intersection between two smooth 2D curves from among the set of 2D curves;

determining, by the computer system, an energy function based on the set of 2D curves, the energy function comprising one or more terms, each term modelling a characteristic of the 2D curves which reflects how concept drawings are commonly perceived by human viewers to represent 3D objects;

performing, by the computer system, an optimization which minimizes the energy function to thereby determine a 3D representation of the 3D object, the 3D representation comprising a set of 3D curves, each 3D curve corresponding to a corresponding one of the set of 2D curves; and wherein at least one of:

determining the energy function comprises determining, by the computer system, the energy function to have a smooth crossing term, the smooth crossing term reflecting a preference for the 3D curves corresponding to the two smooth 2D curves which intersect at the at least one actual intersection, to have tangents which are orthogonal to one another at the at least one actual intersection; and performing the optimization comprises performing, by the computer system, the optimization subject to a smooth crossing constraint, the smooth crossing constraint requiring the 3D curves corresponding to the two smooth 2D curves which intersect at the at least one actual intersection, to have tangents which are orthogonal to one another at the at least one actual intersection.

2. A method according to claim 1 wherein the representation of the set of 2D curves comprises a 2D piecewise spline representation and the 3D representation comprises a corresponding 3D piecewise spline representation.

3. A method according to claim 2 wherein the 2D piecewise spline representation comprises a corresponding set of 2D control points and the 3D piecewise spline representation comprises a corresponding set of 3D control points and there is a one to one correspondence between the 2D control points and the 3D control points.

4. A method according to claim 3 wherein determining the energy function comprises establishing the one to one correspondence between the 2D control points and the 3D control points.

5. A method according to claim 4 wherein performing the optimization comprises maintaining the one to one correspondence between the 2D control points and the 3D control points.

6. A method according to claim 1 comprising obtaining user input which characterizes each of a plurality of curves from among the set of 2D curves to be one of: a cross-section; a trim curve; and a silhouette.

7. A method according to claim 6 comprising determining one or more hard constraints based on the user input and wherein performing the optimization comprises performing a constrained optimization which minimizes the energy function subject to the one or more hard constraints.

8. A method according to claim 7 wherein performing the optimization comprises:

performing a first optimization which determines the 3D representation at locations corresponding to intersections between curves from among the set of 2D curves which are characterized as cross-sections; and after performing the first optimization, performing a section optimization which determines the 3D representation at locations away from the intersections.

9. A method according to claim 8 wherein performing the first optimization comprises determining 3D locations of control points of piecewise spline representations corresponding to intersections between curves from among the set of 2D curves which are characterized as cross-sections.

10. A method according to claim 8 wherein performing the first optimization comprises determining, for the at least one actual intersection between two smooth 2D curves, 3D locations of control points of piecewise spline representations of the 3D curves corresponding to the two smooth 2D curves which intersect at the at least one actual intersection.

11. A method according to claim 1 comprising obtaining user input which comprises an indication of actual intersections between individual 2D curves from among the set of 2D curves.

12. A method according to claim 10 wherein obtaining user input does not include a characterization of curves from among the set of 2D curves to be one of: a cross-section; a trim curve; and a silhouette.

13. A method according to claim 11 wherein performing the optimization comprises performing a plurality of optimizations, each optimization comprising minimizing a corresponding energy function to obtain an intermediate 3D representation and wherein the energy function is different in each of the plurality of optimizations.

14. A method according to claim 13 wherein performing the plurality of optimizations comprises performing an initial optimization, wherein performing the initial optimization comprises:
    performing, by the computer system, the initial optimization subject to an initial smooth crossing constraint, the initial smooth crossing constraint requiring, for each actual intersection between individual 2D curves, the 3D curves corresponding to the two individual 2D curves which intersect at the actual intersection, to have tangents which are orthogonal to one another at the actual intersection.

15. A method according to claim 14 wherein, for the initial optimization, the corresponding energy function comprises a term which reflects a preference for the tangents to curves at adjacent intersections between curves to be parallel with one another.

16. A method according to claim 13 wherein performing the plurality of optimizations comprises performing an initial optimization, wherein performing the initial optimization comprises:
    performing the initial optimization with an initial energy function, the initial energy function comprising, for each actual intersection between individual 2D curves, an initial smooth crossing term which reflects a preference for the 3D curves corresponding to the two individual 2D curves which intersect at the actual intersection, to have tangents which are orthogonal to one another at the actual intersection.

17. A method according to claim 13 comprising, between each of the plurality of optimizations, evaluating a regularity at a plurality of regularity evaluation instances in the intermediate 3D representation and augmenting the energy function based on the regularity evaluation.

18. A method according to claim 17 wherein the regularity evaluation comprises evaluating a tangent parallelism likelihood that tangents to curves which intersect a given curve at adjacent intersections are parallel to one another at the adjacent intersections and, for each pair of adjacent intersections, performing at least one of: augmenting the energy function based on the tangent parallelism likelihood; adding a hard constraint to subsequent optimizations; and discarding the pair of adjacent intersections from further regularity evaluation.

19. A method according to claim 17 wherein the regularity evaluation comprises evaluating a tangent orthogonality likelihood that tangents to curves which intersect at an intersection are orthogonal to one another at the intersection and, for each intersection, performing at least one of: augmenting the energy function based on the tangent orthogonality likelihood; adding a hard constraint to subsequent optimizations; and discarding the intersection from further regularity evaluation.

20. A method according to claim 17 wherein the regularity evaluation comprises evaluating a local symmetry likelihood that curves are locally symmetric at an intersection and, for each intersection, performing at least one of:
    augmenting the energy function based on the local symmetry likelihood;
    adding a hard constraint to subsequent optimizations; and
    discarding the intersection from further regularity evaluation.

21. A method according to claim 17 wherein the regularity evaluation comprises evaluating a curve planarity likelihood that curves are planar and, for each curve, performing at least one of:
    augmenting the energy function based on the curve planarity likelihood;
    adding a hard constraint to subsequent optimizations; and
    discarding the intersection from further regularity evaluation.

22. A method according to claim 17 wherein the regularity evaluation comprises evaluating a curve linearity likelihood that curves are linear and, for each curve, performing at least one of:
    augmenting the energy function based on the curve linearity likelihood;
    adding a hard constraint to subsequent optimizations; and
    discarding the intersection from further regularity evaluation.

23. A method according to claim 1 wherein the estimate of the 3D representation deviates from a substantially accurate representation of the 3D object by less than a threshold amount.

24. A computer program product comprising a set of instructions embodied on a non-transitory computer readable medium, the instructions when executed by a processor, causing the processor to perform the method of claim 1.

* * * * *